United States Patent
Huang et al.

(10) Patent No.: US 12,451,943 B2
(45) Date of Patent: Oct. 21, 2025

(54) METHODS AND APPARATUS TO FACILITATE CSI FEEDBACK IN MULTIPLE-TRP COMMUNICATION

(71) Applicant: QUALCOMM Incorporated, San Diego, CA (US)

(72) Inventors: Min Huang, Beijing (CN); Chenxi Hao, Beijing (CN); Liangming Wu, Beijing (CN); Qiaoyu Li, Beijing (CN); Yu Zhang, San Diego, CA (US); Chao Wei, Beijing (CN); Kangqi Liu, Beijing (CN); Jing Dai, Beijing (CN); Hao Xu, Beijing (CN); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 17/794,239

(22) PCT Filed: Feb. 12, 2021

(86) PCT No.: PCT/CN2021/076634
§ 371 (c)(1),
(2) Date: Jul. 20, 2022

(87) PCT Pub. No.: WO2021/160180
PCT Pub. Date: Aug. 19, 2021

(65) Prior Publication Data
US 2023/0071931 A1 Mar. 9, 2023

(30) Foreign Application Priority Data
Feb. 14, 2020 (WO) ............... PCT/CN2020/075251

(51) Int. Cl.
*H04B 17/309* (2015.01)
*H04B 7/06* (2006.01)
(Continued)

(52) U.S. Cl.
CPC ......... *H04B 7/0626* (2013.01); *H04B 7/0632* (2013.01); *H04B 7/0639* (2013.01); *H04L 5/0057* (2013.01); *H04B 7/024* (2013.01)

(58) Field of Classification Search
None
See application file for complete search history.

(56) References Cited

U.S. PATENT DOCUMENTS

| 10,804,978 | B2 | 10/2020 | Manolakos et al. |
| 2013/0003788 | A1 | 1/2013 | Marinier et al. |

(Continued)

FOREIGN PATENT DOCUMENTS

| CN | 109196799 A | 1/2019 |
| CN | 110784922 A | 2/2020 |

(Continued)

OTHER PUBLICATIONS

Samsung: "Enhancements on Multi-TRP/Panel Transmission", 3GPP TSG RAN WG1 Meeting #99, R1-1912482, 3rd Generation Partnership Project, Mobile Competence Centre, 650, Route Des Lucioles, F-06921 Sophia-Antipolis Cedex, France, vol. RAN WG1, No. Reno, USA; Nov. 18, 2019-Nov. 22, 2019, Nov. 22, 2019, 13 Pages, Section 4.2.

(Continued)

*Primary Examiner* — Duc T Duong
(74) *Attorney, Agent, or Firm* — Procopio, Cory, Hargreaves & Savitch LLP/Qualcomm

(57) ABSTRACT

Apparatus, methods, and computer-readable media for facilitating CSI feedback in multiple-TRP communication are disclosed herein. An example method of wireless com-
(Continued)

munication by a UE includes receiving, from a base station, a report configuration message triggering a channel state feedback procedure, the UE and the base station operating in a multiple transmission and reception point (multiple-TRP) communication mode, the report configuration message requesting a multiple-TRP transmission value including at least one of a quantity of layer indicator (LI) values and a strongest TRP indicator (STI) value. The example method also includes generating channel state information (CSI) information based on the receiving of the report configuration message, the CSI information including the multiple-TRP transmission value. The example method also includes transmitting, to the base station, a report including the generated CSI information.

30 Claims, 12 Drawing Sheets

(51) Int. Cl.
  *H04L 5/00* (2006.01)
  *H04W 24/10* (2009.01)
  *H04B 7/024* (2017.01)

(56) References Cited

U.S. PATENT DOCUMENTS

| | | | |
|---|---|---|---|
| 2018/0042028 A1 | 2/2018 | Nam et al. | |
| 2019/0081678 A1 | 3/2019 | Park et al. | |
| 2019/0081755 A1 | 3/2019 | Wang et al. | |
| 2019/0109626 A1 | 4/2019 | Park et al. | |
| 2019/0149285 A1 | 5/2019 | Tsai et al. | |
| 2019/0260448 A1 | 8/2019 | Rahman et al. | |
| 2019/0379506 A1* | 12/2019 | Cheng | H04W 88/06 |
| 2020/0350967 A1* | 11/2020 | Xu | H04B 7/022 |
| 2021/0258060 A1* | 8/2021 | Gao | H04B 7/0632 |
| 2021/0298037 A1* | 9/2021 | Matsumura | H04W 72/23 |
| 2022/0029682 A1* | 1/2022 | Park | H04B 7/0626 |
| 2022/0302981 A1* | 9/2022 | Liu | H04L 5/0051 |
| 2022/0385384 A1* | 12/2022 | Jiang | H04B 7/063 |
| 2023/0208490 A1* | 6/2023 | Kim | H04L 5/0051 370/329 |

FOREIGN PATENT DOCUMENTS

| | | |
|---|---|---|
| WO | 2017196083 A1 | 11/2017 |
| WO | 2019029461 A1 | 2/2019 |
| WO | 2020029176 A1 | 2/2020 |

OTHER PUBLICATIONS

Supplementary European Search Report—EP21754055—Search Authority—Munich—Feb. 20, 2024.
AT&T: "Remaining Issues in Multi TRP Transmission," 3GPP TSG RAN WG1 #97, R1-1907171, Reno, USA, May 13-17, 2019 (May 17, 2019), the whole document, pp. 1-21.
CATT: "Discussion on CSI Feedback for Multi TRP Transmission," 3GPP TSG RAN WG1 #90, R1-1712375, Prague, Czechia, Aug. 21-25, 2017 (Aug. 25, 2017), 4 pages.
Ericsson: "CSI Feedback for Multi-TRP," 3GPP TSG RAN WG1 Meeting 90bis, R1-1718737, Prague, CZ, Oct. 9-13, 2017, (Oct. 13, 2017), the whole document, 7 pages.
International Search Report and Written Opinion—PCT/CN2020/075251—ISA/EPO—Oct. 28, 2020.
International Search Report and Written Opinion—PCT/CN2021/076634—ISA/EPO—May 19, 2021.
Samsung: "Enhancements on Multi-TRP/Panel Transmission," 3GPP TSG RAN WG1 Meeting #94bis, R1-1810885, Chengdu, China, Oct. 8-12, 2018, (Oct. 12, 2018), the whole document, 5 pages.
Samsung: "Enhancements on Multi-TRP/Panel Transmission", Chongqing, China, Oct. 14-20, 2019, R1-1910493, 3GPP TSG RAN WG1 Meeting #98bis, Oct. 20, 2019 (Oct. 20, 2019) Section 5.2, 17 Pages.
Spreadtrum Communications: "Discussion on Multi-TRP Transmission," Draft, 3GPP TSG RAN WG1 #99, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 18, 2019-Nov. 22, 2019, Nov. 8, 2019 (Nov. 8, 2019), 10 pages, Retrieved from the Internet: URL: https://ftp.3gpp.org/tsg_ran/WG1_RL1/TSGR1_99/Docs/R1-1912562.zip R1-1912562 Discussion on Multi-TRP transmission.docx [retrieved on Nov. 8, 2019] the whole document.

* cited by examiner

METHODS AND APPARATUS TO FACILITATE CSI FEEDBACK IN MULTIPLE-TRP COMMUNICATION

CROSS REFERENCE TO RELATED APPLICATION(S)

This application is National Stage Application filed under 35 U.S.C. § 371 of PCT International Application Serial No. PCT/CN2021/076634, entitled "METHODS AND APPARATUS TO FACILITATE CSI FEEDBACK IN MULTIPLE-TRP COMMUNICATION" and filed Feb. 12, 2021, which claims the benefit of International Patent Application Serial No. PCT/CN2020/075251, entitled "Methods and Apparatus to Facilitate CSI Feedback in Multi-TRP Communication," and filed on Feb. 14, 2020, which are expressly incorporated by reference herein in their entirety.

BACKGROUND

Technical Field

The present disclosure relates generally to communication systems, and more particularly, to wireless communication systems including multiple transmission and reception points (TRPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A channel state feedback procedure may include a first device (e.g., a user equipment (UE)) receiving a channel state information reference signal (CSI-RS) from a second device (e.g., a base station), generating (or measuring) CSI information based on, for example, the CSI-RS, and transmitting a CSI report including the CSI information to the second device. The performing of the channel state feedback procedure may facilitate channel estimation at the first device. The CSI information generated by the first device may include one or more components, such as a CSI-RS resource indicator (CRI), a rank indicator (RI), a channel quality indicator (CQI), a precoding matrix indicator (PMI), a layer indicator (LI), etc. In some examples, the second device (e.g., the base station) may transmit a message to the first device (e.g., the UE) based on the CSI information included in the CSI report.

In some examples, wireless networks may support connectivity for a large number of UEs. Such wireless networks may include multiple transmission and receptions points (TRPs) to improve reliability, coverage, and/or capacity. In a multiple-TRP communications system, a base station and a UE may communicate with each other by sending messages using one or more of the TRPs. For example, the base station may connect to multiple geographically-distributed TRPs, which may then separately or jointly transmit messages to one or more UEs and/or may separately or jointly receive messages from or more UEs. For example, a base station may connect with a first TRP and a second TRP, which may each be connected with a UE. In some such examples, the base station and the UE may communicate (e.g., transmit and/or receive messages) via the first TRP, may communicate via the second TRP, or may communicate via the first TRP and the second TRP.

In examples in which the base station and the UE are operating in a multiple-TRP communication mode, while performing a channel state feedback procedure, the UE may generate CSI information for each of the TRPs. Thus, it may be appreciated that as the quantity of TRPs increases, the size of the CSI report may also increase.

Example techniques disclosed herein enable a base station and a UE, that are operating in a multiple-TRP communication mode, to improve the performing of the channel state feedback procedure by employing a CSI report configuration that configures the information included in the CSI report. In some examples, the base station may transmit the CSI report configuration to the UE to trigger the UE to perform the channel state feedback procedure. In some examples, the CSI report configuration may indicate to the UE what information to include in the CSI report. For example, the CSI report configuration may instruct the UE to include a quantity of LI values. In additional or alternative examples, the CSI report configuration may configure the UE to include an identifier of a strongest TRP.

In an aspect of the disclosure, a method, a computer-readable medium, and an apparatus are provided for wireless communication of a UE. The apparatus may receive, from a base station, a report configuration message triggering a channel state feedback procedure, the report configuration message requesting a multiple-TRP transmission value including at least one of a quantity of layer indicator (LI)

values and a strongest TRP indicator (STI) value. In some examples, the UE and the base station may be operating in a multiple transmission and reception point (multiple-TRP) communication mode. The apparatus may also generate channel state information (CSI) information based on the receiving of the report configuration message. In some examples, the CSI information may include the multiple-TRP transmission value. The apparatus may also transmit, to the base station, a report including the generated CSI information.

In another aspect of the disclosure, a method, a computer-readable medium, and an apparatus provided for wireless communication of a base station. The apparatus may transmit, to a user equipment (UE), a report configuration message triggering a channel state feedback procedure, the report configuration message requesting a multiple-TRP transmission value including at least one of a quantity of layer indicator (LI) values and a strongest TRP indicator (STI) value. In some examples, the UE and the base station may be operating in a multiple transmission and reception point (multiple-TRP) communication mode. The apparatus may also receive, from the UE, a report including at least the multiple-TRP transmission value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
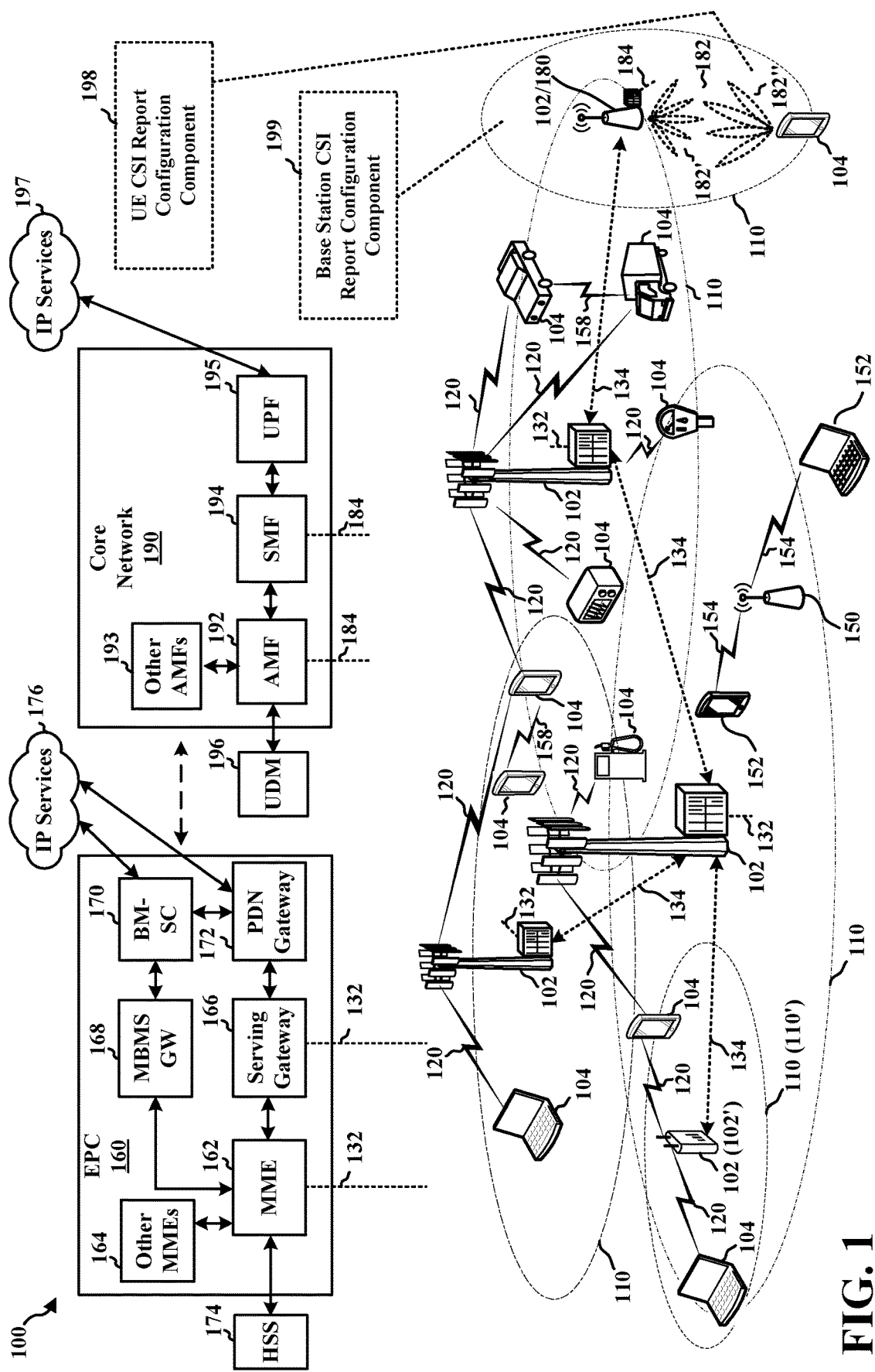
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via CSI report configuration while operating in a multiple-TRP communication mode. For example, the UE 104 of FIG. 1 includes a UE CSI report configuration component 198 configured to receive, from a base station, a report configuration message triggering a channel state feedback procedure, the report configuration message requesting a multiple-TRP transmission value including at least one of a quantity of layer indicator (LI) values and a strongest TRP indicator (STI) value. The UE CSI report configuration component 198 may also be configured to generate channel state information (CSI) information based on the receiving of the report configuration message. In some examples, the CSI information may include the multiple-TRP transmission value. The UE CSI report configuration component 198 may also be configured to transmit, to the base station, a report including the generated CSI information.

Still referring to FIG. 1, in certain aspects, the base station 180 may be configured to manage one or more aspects of wireless communication via CSI report configuration while operating in a multiple-TRP communication mode. For example, the base station 180 of FIG. 1 includes a base station CSI report configuration component 199 configured to transmit, to a user equipment (UE), a report configuration message triggering a channel state feedback procedure, the report configuration message requesting a multiple-TRP transmission value including at least one of a quantity of layer indicator (LI) values and a strongest TRP indicator (STI) value. The base station CSI report configuration component 199 may also be configured to receive, from the UE, a report including at least the multiple-TRP transmission value.

Although the following description provides examples related to 5G NR, the concepts described herein may be applicable to other similar areas, such as LTE, LTE-A, CDMA, GSM, and/or other wireless technologies, in which a UE and a base station are operating in a multiple-TRP communication mode.

Figure 2:
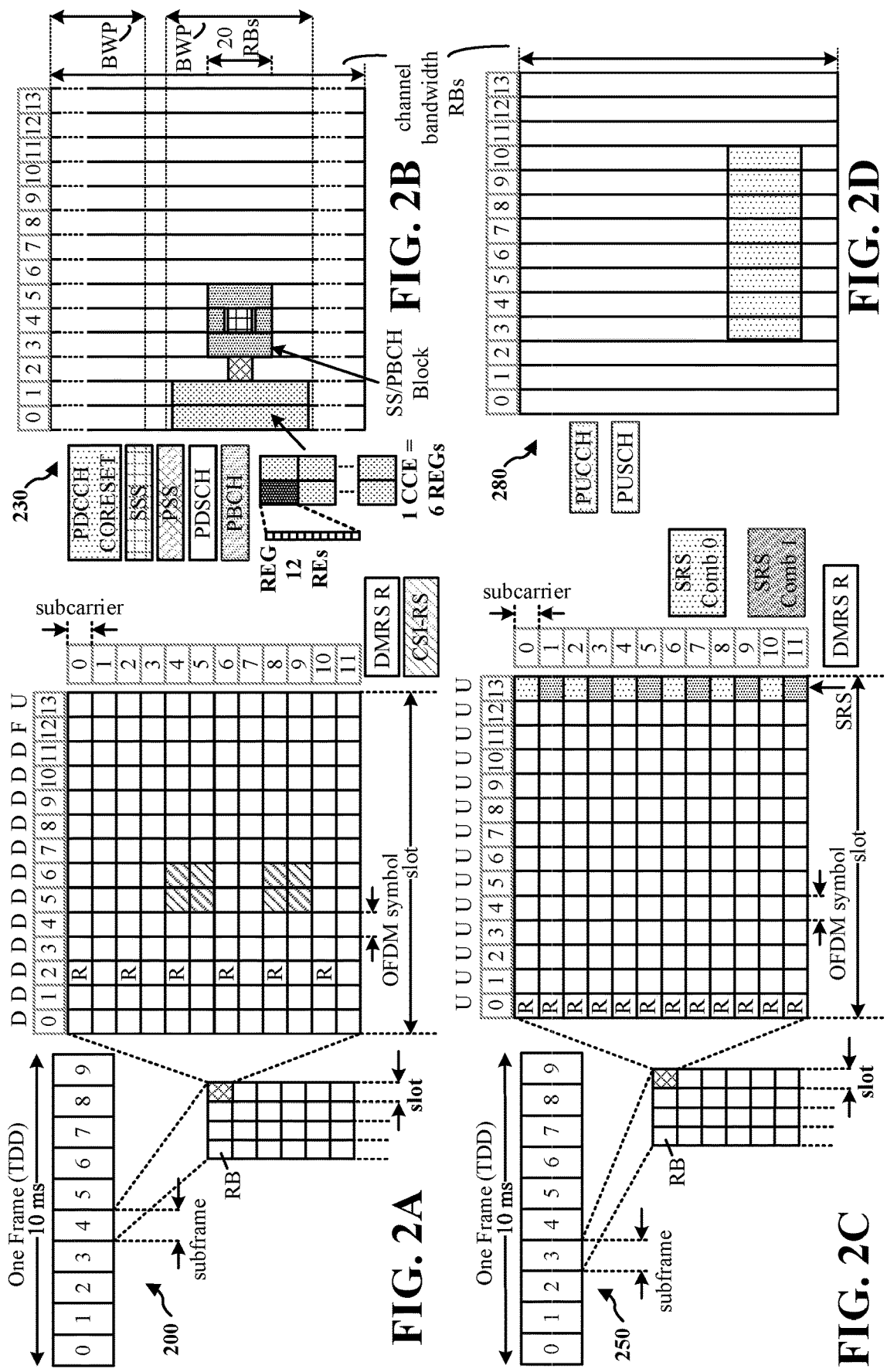
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2^\mu$ slots/subframe. The subcarrier spacing and symbol length/duration are a function of the numerology. The subcarrier spacing may be equal to $2^\mu *15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
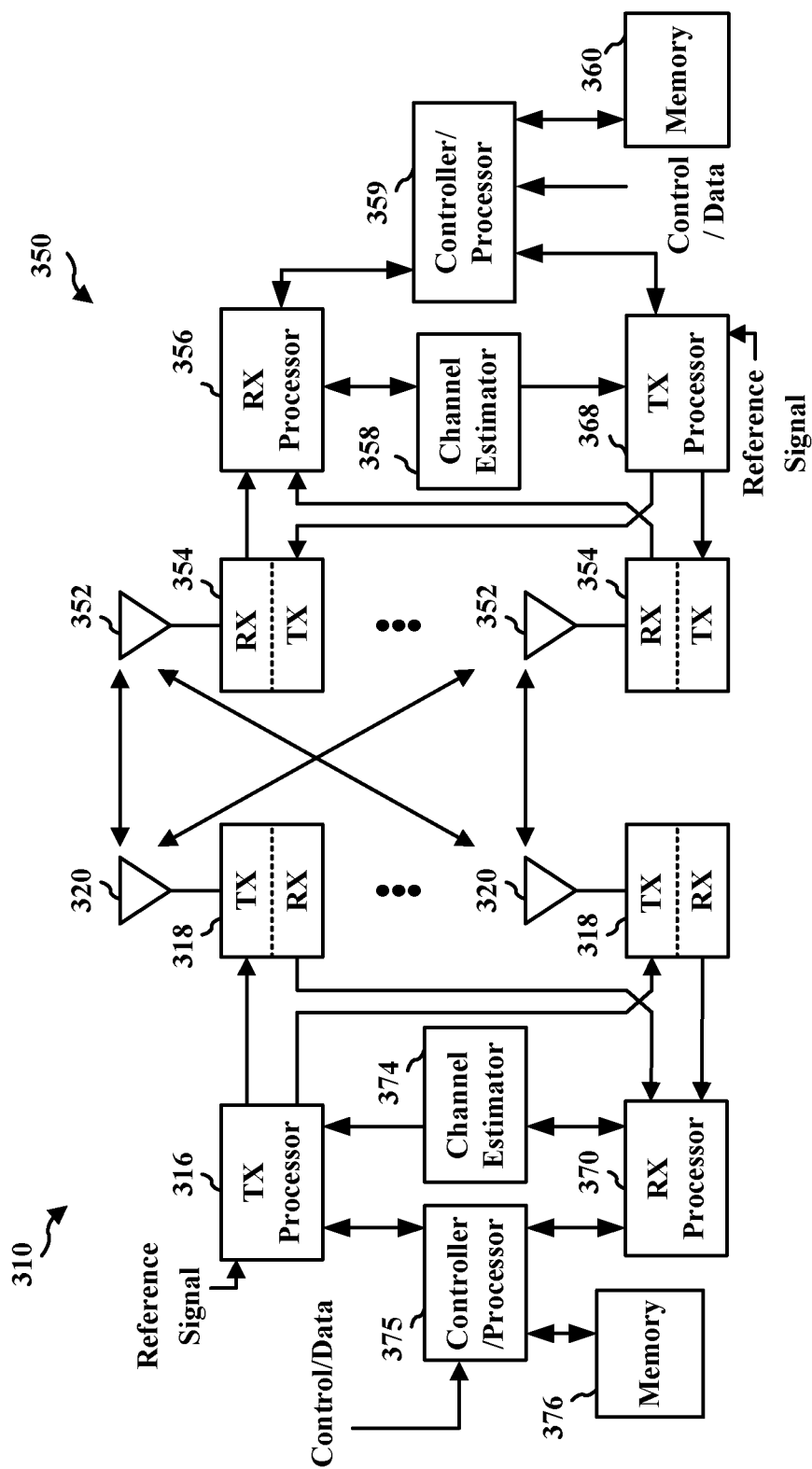
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE CSI report configuration component 198 of FIG. 1.

At least one of the TX processor 316, the RX processor 370, and the controller/processor 375 may be configured to perform aspects in connection with the base station CSI report configuration component 199 of FIG. 1.

Wireless networks may support connectivity for a large number of UEs. Such wireless networks may support high capacity communication and/or URLLC communication. A wireless network may include multiple transmission and reception points (TRPs) to improve reliability, coverage, and capacity. TRPs may include any of a macro-cell, a small cell, a pico-cell, a femto-cell, a remote radio head, a relay node, etc. In some examples, UEs at a cell edge may experience low Quality-of-Service (QOS) due to a longer distance from the base station to the UE and/or due to interference from neighboring base stations. Multiple-TRP communication may include dynamic coordination between the multiple TRPs to, for example, provide joint scheduling and transmission/reception for the UE. In this way, a UE at the cell edge can be served by multiple-TRPs to improve its signal transmission/reception resulting in increased throughput. In some examples, control signals may be transmitted to a UE from multiple-TRPs (e.g., to improve reliability for URLLC, V2X, high speed UEs, etc.). The control signaling from the multiple-TRPs may provide link diversity gain and may improve reception for UEs that are near to or at a cell edge. In devices that communicate using multiple beams, such multiple-TRP communication may include beam management procedures.

Figure 4:
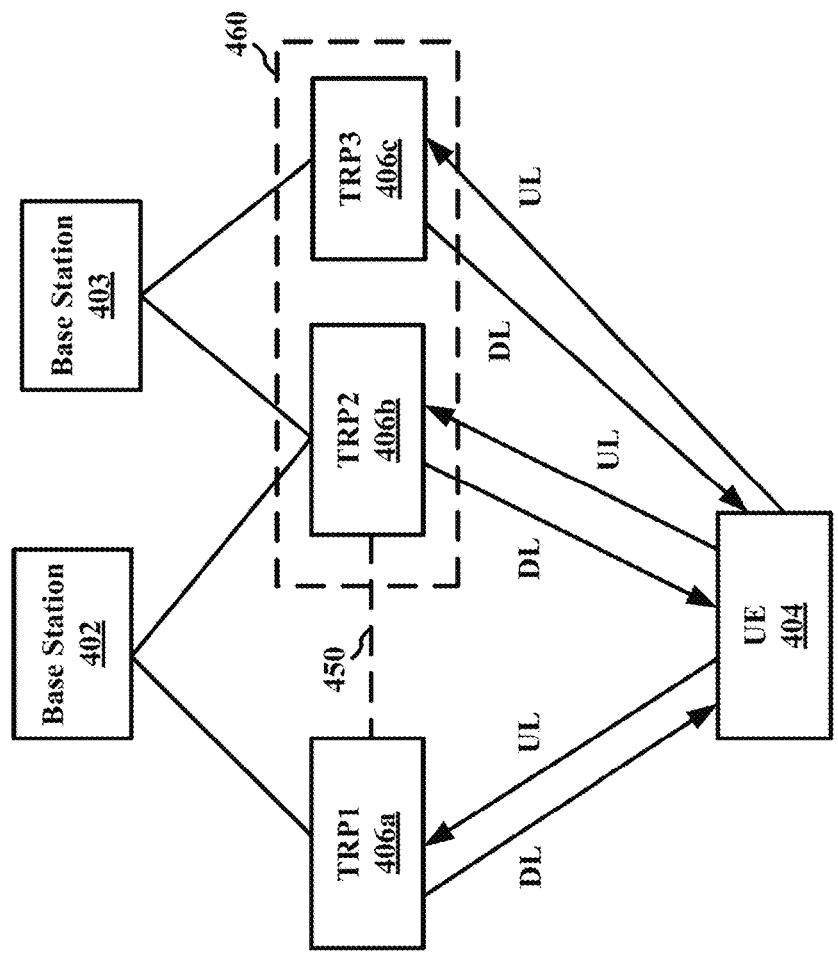
FIG. 4 is a diagram illustrating an example of a wireless communications system including a UE, a base station, and multiple transmit reception points (TRPs), in accordance with the teachings disclosed herein.

FIG. 4 illustrates an example communication system 400 including a base station 402, a UE 404, a first TRP 406a ("TRP1"), and a second TRP 406b ("TRP2"), in accordance with the teachings disclosed herein. In the illustrated example, the base station 402 and the UE 404 are operating in a multiple-TRP communication mode in which the base station 402 is connected to the first TRP 406a and the second TRP 406b, which are connected to the UE 404. Accordingly, a message transmitted by the base station 402 and received by the UE 404 (or transmitted by the UE 404 and received by the base station 402) may be communicated via one or both of the first TRP 406a and the second TRP 406b. For example, with respect to a downlink message transmitted by the base station 402 to the UE 404, the downlink message may be transmitted by the base station 402 to one or both of the first TRP 406a and the second TRP 406b, and then by the one or both of the first TRP 406a and the second TRP 406b to the UE 404.

For example, the downlink message may be transmitted by the base station 402 and received by the first TRP 406a, and then the downlink message may be transmitted by the first TRP 406a and received by the UE 404. In some examples, the downlink message may be transmitted by the base station 402 and received by the second TRP 406b, and then the downlink message may be transmitted by the second TRP 406b and received by the UE 404. In some examples, the downlink message may be transmitted by the base station 402 and received by the first TRP 406a and the second TRP 406b, and then the downlink message may be transmitted by the first TRP 406a and the second TRP 406b and received by the UE 404. In some such examples in which the base station 402 transmits the downlink message that is received by the first TRP 406a and the second TRP 406b, the downlink message received by the first TRP 406a and the message received by the second TRP 406b may be similar. In some examples, the base station 402 may divide a message into two or more parts and, for example, transmit a first part of the message to the first TRP 406a and transmit a second part of the message to the second TRP 406b. Accordingly, as used herein, when a message (e.g., a downlink message or an uplink message) is indicated as being transmitted by a first device (e.g., the base station 402 and/or the UE 404) and received by a second device (e.g., the UE 404 and/or the base station 402), it may be appreciated that the message is first transmitted by the first device and received by one or both of the first TRP 406a and the second TRP 406b, and then transmitted by the one or both of the first TRP 406a and the second TRP 406b to the second device.

When employing a multiple-TRP communication mode, transmissions may comprise a joint transmission in which multiple-TRPs contemporaneously transmit data, for example, to a UE. A joint transmission may comprise a coherent joint transmission (CJT) or a non-coherent joint transmission (NCJT). A coherent joint transmission corresponds to when the multiple-TRPs are able to coordinate with each other. However, when the multiple-TRPs are not able to coordinate, for example, due to a non-ideal backhaul, the joint scheduling between the TRPs may not be feasible (e.g., due to a delay of coordination of control signaling and/or data packets, and/or limited backhaul capacity).

For example, in the illustrated example of FIG. 4, the first TRP 406a and the second TRP 406b may establish a backhaul connection 450 that enables the first TRP 406a and the second TRP 406b to coordinate joint transmissions (e.g., coherent joint transmissions). Accordingly, the first TRP 406a and the second TRP 406b may coordinate when transmitting messages from the base station 402 to the UE 404 and/or from the UE 404 to the base station 402. For example, the first TRP 406a and the second TRP 406b may coordinate transmissions to reduce interference or overlapping of signals.

In other examples, one or more of the TRPs may not be able to coordinate joint transmissions. For instance, FIG. 4 includes a second base station 403 that may operate in a multiple-TRP communication mode with the UE 404. For example, the base station 402 may be connected to the second TRP 406b and the third TRP 406c, which are connected to the UE 404. Accordingly, a message transmitted by the second base station 403 and received by the UE 404 (or transmitted by the UE 404 and received by the second base station 403) may be communicated via one or both of the second TRP 406b and the third TRP 406c. For example, with respect to a downlink message transmitted by the second base station 403 to the UE 404, the downlink message may be transmitted by the base station 402 to one or both of the second TRP 406b and the third TRP 406c, and then by the one or both of the second TRP 406b and the third TRP 406c to the UE 404. The second TRP 406b and the third TRP 406c may be referred to as a "TRP group with NCJT" (e.g., a TRP group with NCJT 460). That is, the second TRP 406b and the third TRP 406c may facilitate transmitting joint transmissions, but the transmissions may be non-coherent joint transmissions.

Although the above description provides an example in which the communication system 400 includes three TRPs, it may be appreciated that in other examples, the communication system may include any suitable quantity of TRPs. Additionally, other examples may include any suitable quantity of TRPs that facilitate coherent joint transmissions, any suitable quantity of TRPs that facilitate non-coherent joint transmissions, and/or any suitable quantity of TRP groups with NCJT.

In some examples, wireless networks may support connectivity for a large number of UEs. Such wireless networks may include multiple-TRPs to improve reliability, coverage, and/or capacity (such as the example communication system 400 of FIG. 4). In a multiple-TRP communications system, a base station and a UE may communicate with each other by sending messages using one or more of the TRPs. For example, the base station may connect to one or more geographically-distributed TRPs, which may then separately or jointly transmit messages to one or more UEs and/or may separately or jointly receive messages from or more UEs. For example, in the example of FIG. 4, the base station 402 may connect with the first TRP 406a and the second TRP 406b, which may each be connected with the UE 404. In some such examples, the base station and the UE may communicate (e.g., transmit and/or receive messages) via the first TRP, may communicate via the second TRP, or may communicate via the first TRP and the second TRP.

A channel state feedback procedure may include a first device (e.g., a user equipment (UE)) receiving a channel state information reference signal (CSI-RS) from a second device (e.g., a base station), generating (or measuring) CSI information based on, for example, the CSI-RS, and transmitting a CSI report including the CSI information to the second device. The performing of the channel state feedback procedure may facilitate channel estimation at the first device. The CSI information generated by the first device may include one or more components, such as a CSI-RS resource indicator (CRI), a rank indicator (RI), a channel quality indicator (CQI), a precoding matrix indicator (PMI), a layer indicator (LI), etc. In some examples, the second device (e.g., the base station) may transmit a message to the first device (e.g., the UE) based on the CSI information included in the CSI report. For example, the base station may transmit downlink data to the UE based on a precoding matrix indicated by a PMI value of the CSI report. In some examples, the base station may transmit a phase tracking reference signal (PT-RS) to the UE based on the layer indicated by an LI value of the CSI report.

In some examples, the receiving of the CSI-RS may trigger the UE to transmit a CSI report including CSI information. The UE may then generate the CSI information based on the CSI-RS. The CSI information may include a CRI, an RI, a CQI, a PMI, a LI, etc.

When operating in a multiple-TRP communication mode, the UE may transmit the CSI report using one or more of the TRPs. For example, when operating in a two-TRP communication system (as shown in connection with the base station 402, the UE 404, the first TRP 406a, and the second TRP 406b of FIG. 4 and/or second base station 403, the UE 404, and the TRP group with NCJT 460 of FIG. 4), the UE may transmit the CSI report via the first TRP (e.g., the first TRP 406a or the third TRP 406c), via the second TRP (e.g., the second TRP 406b), or via both TRPs (e.g., the first TRP 406a and the second TRP 406b or the second TRP 406b and the third TRP 406c). Furthermore, in some examples, the UE may divide the CSI report into different parts when transmitting the CSI report to the base station. For example, the UE may divide the CSI report into two parts by including a first portion of the CSI information into a first CSI report message and including a second portion of the CSI information into a second CSI report message. In some such examples, the UE may transmit both parts of the CSI report via the first TRP, via the second TRP, or via both TRPs. Additionally, the UE may determine to transmit the CSI report to the base station by transmitting the first CSI report message using the first TRP and transmitting the second CSI report message using the second TRP.

It may be appreciated that while the above example describes dividing the CSI report into two parts and transmitting each CSI report part using a different TRP, in other examples, the UE may determine to divide the CSI report into any suitable quantity of parts and may determine to transmit any suitable quantity of the CSI report parts using any suitable combination of TRPs.

In some examples, when the UE is performing the channel state feedback procedure, the UE may generate CSI information including a PMI. The PMI may be used to indicate a quantized precoding matrix and may include one or more codepoints of a codebook. In some examples, the UE may determine the PMI based on an RI and a CRI. In some examples, the UE may transmit the PMI without frequency-compression, which may improve the accuracy of reported information, but may also increase overhead in signaling (e.g., by increasing the amount of CSI information included in the CSI report). In other examples, the UE may transmit the PMI with frequency-compression, which may reduce overhead in signaling, but may also reduce the accuracy of the reported information.

In some examples in which the UE transmits the PMI without frequency-compression, the PMI may include wideband PMI information and sub-band PMI information for associated sub-bands. For example, for wideband or for one sub-band, a precoding matrix (W) may be a product of a first matrix ($W_1$) and a second matrix ($W_2$), where the precoding matrix (W) comprises P rows and $N_{layer}$ columns. In some such examples, the quantity of rows (P) of the precoding matrix (W) may be represented by twice the product of $N_1$ and $N_2$, where the variable $N_1$ represents a quantity of horizontal antenna elements and the variable $N_2$ represents a quantity of vertical antenna elements of the UE. The first matrix ($W_1$) may represent a spatial-domain basis including L beans (e.g., L columns) per polarization group. The second matrix ($W_2$) may represent the coefficients corresponding to the contribution for each beam in each layer. When the precoding matrix (W) corresponds to wideband, the matrices ($W_1$) and ($W_2$) may both be wideband. When the precoding matrix (W) corresponds to a sub-band, the first matrix ($W_1$) may be wideband and the second matrix ($W_2$) may be a sub-band. The UE may then report the quantization results of the first matrix ($W_1$) and the second matrix ($W_2$) as PMI.

In examples in which the UE transmits the PMI with frequency-compression, the PMI may include spatial-domain basis information, coefficients, and frequency-domain basis information. For example, for one layer, a compressed precoding matrix (W) may exploit the sparsity of both spatial-domain information and frequency-domain information. In some such examples, the compressed precoding matrix (W) may be a product of a first matrix ($W_1$), a second matrix ($W_2$), and a third matrix ($W_f^H$). The first matrix ($W_1$) may represent spatial-domain basis information and may include P rows and 2*L columns, where the variable L represents the quantity of beams (or columns) per polarization group. The second matrix ($W_2$) may represent linear combination coefficients (e.g., amplitude and/or phase) and may include 2*L rows and M columns, where each element of the second matrix ($W_2$) corresponds to a coefficient of a tap for a beam. The third matrix ($W_f^H$) may represent frequency-domain basis information and may include M rows and $N_3$ columns. In some examples, the third matrix ($W_f^H$) may include basis vectors that are used to perform compression in the frequency domain. In such examples, each row may correspond to a basis vector. For example, the basis vectors of the third matrix ($W_f^H$) may be derived from a number of columns in a discrete Fourier transform (DFT) matrix. In some such examples, the compressed precoding matrix (W) may include P rows and $N_3$ columns. The UE may then report the quantization results of the first matrix ($W_1$), the second matrix ($W_2$), and the third matrix ($W_f^H$) for all layers as PMI.

In some examples, the CSI information generated by the UE may include one PMI value. For example, when the UE and the base station are operating in a zero TRP communication system or a single TRP communication system, the UE may transmit a CSI report including one PMI value that is received by the base station. However, in examples in which the UE and the base station are operating in a multiple-TRP communication system, the UE may generate multiple PMI values. For example, the CSI information may include a PMI value for each TRP of the multiple-TRP communication system.

In some examples, when performing the channel state feedback procedure, the UE may generate CSI information including a layer indicator (LI). The LI value may indicate which column of a precoding matrix of the reported PMI corresponds to the strongest layer of a codeword corresponding to the largest reported wideband CQI. It may be appreciated that there may be one or more wideband CQI values in one CSI report. In some such examples, the one or more wideband CQI values may correspond to a different codeword. As noted above, a wideband CQI value may correspond to a PMI value. Furthermore, in some examples, the precoding matrix indicated by the PMI value may include one or more columns (as indicated by the RI value). In some such examples, the LI value indicates the column of the precoding matrix, indicated by the PMI value, that corresponds to the strongest spatial layer. If the CSI report includes two wideband CQIs that have the same value, the LI may correspond to the strongest layer of the first codeword.

Thus, it may be appreciated that the LI value of the CSI report may be determined based on the generated CQI, PMI, RI, and CRI. For example, a precoding matrix may be associated with one or more layers (or columns). The RI value may indicate the quantity of layers included in the precoding matrix indicated by the PMI value. For an RI value and PMI value pairing, if the RI value is one, then it may be determined that the corresponding precoding matrix includes one layer. In some such examples, the UE may determine not to include an LI value for the precoding matrix as the one layer represents the strongest layer. In examples in which the RI value is greater than one (e.g., the precoding matrix includes two or more layers), the UE may determine the LI value based on the index of the layer that is the strongest (e.g., the layer associated with the largest channel response).

In some examples, the base station may use the LI value of the CSI report to transmit a downlink message to the UE. For example, the base station may transmit a phase tracking reference signal (PT-RS) in the layer indicated by the LI value of the CSI report. By using the layer indicated by the LI value (e.g., the strongest spatial layer of the spatial layers measured by the UE), the base station is able to improve reception performance of the PT-RS at the UE. Furthermore, the UE may perform phase noise estimation based on the PT-RS and, thus, may be able to improve estimating the phase noise due to the improved reception performance of the PT-RS.

In some examples, the CSI report may include one LI value. In a zero-TRP communication system or a single-TRP communication system, the one LI value may be acceptable for the transmitting of downlink messages using the layer indicated by the one LI value. However, in a multiple-TRP communication system, it may be appreciated that the measurements made by the UE, when generating the CSI information, may vary for the respective TRPs. That is, the layer indicated by a single LI value may not represent the strongest spatial layer for each of the TRPs. For example, the phase-noise parameters for each TRP may not be identical. Accordingly, example techniques disclosed herein include a CSI report configuration that may indicate to a UE a quantity of LI values to include in the CSI report when the base station and the UE are operating in a multiple-TRP communication mode. Furthermore, in some examples, the CSI report configuration may include identifiers for one or more TRPs for which the UE is to include LI values.

In some examples, a set of wideband CQI values may be associated with a TRP and each wideband CQI value of the set may correspond to a codeword. It may be appreciated that the set of wideband CQI values may include one or more wideband CQI values. In some examples in which the base station and the UE are operating in a multiple-TRP communication mode, the CSI report provided by the UE may include CSI information for two or more TRPs. For example, the CSI report may include two or more sets of CQI values and each CQI values set may correspond to a respective TRP.

However, in some examples, the UE may not have sufficient UL resources (e.g., due to limited uplink control channel resources, large propagation loss, etc.) to include all of the generated CSI information in the allocated UL resources (e.g., a number of symbols, a sub-slot, or one time slot). In some such examples, the UE may divide the CSI information into two or more parts and transmit the divided CSI information in respective CSI report parts. For example, the UE may divide the CSI information into a primary part and a secondary part. The UE may then transmit the primary part of the CSI information using a primary CSI report message and may transmit the secondary part of the CSI information using one or more secondary CSI report messages.

Although the above description provides an example in which the UE divides the CSI information due to insufficient UL resources, it may be appreciated that in other examples, the UE may divide the CSI information into the two or more parts due to, for example, signaling provided by the base station.

In some examples, the primary CSI report message may be defined by a fixed size. To enable the fixed size of the primary CSI report message to apply to any quantity of TRPs (or TRP groups) while operating in the multiple-TRP communication mode, the primary part of the CSI information may be configured to include one set of CQI values that correspond to the TRP (or TRP groups) with the strongest CQI value. The sets of CQI values associated with the other TRPs (or TRP groups) may be included in the secondary part of the CSI information and may be transmitted to the base station by the UE using the one or more secondary CSI report messages (collectively referred to herein as "the secondary CSI report message").

In some examples, the primary part of the CSI information may be configured so that the base station is able to operate using the information provided by the primary CSI report message. For example, the base station may receive the primary CSI report message, but may not receive the secondary CSI report message. In some such examples, the base station may use the CSI information of the primary CSI report message (e.g., the primary part of the CSI information generated by the UE) to determine how and/or what information to transmit in a downlink message to the UE.

However, in some examples, it may be possible that the primary part of the CSI information may not include an identifier of the TRP (or TRP groups) for which the set of CQI values is associated. In some such examples, if the secondary CSI report message is not successfully received by the base station, the base station may determine the set of CQI values included in the primary CSI report message to be invalid as the base station may be unable to use the set of CQI values for the transmitting of the downlink message. Furthermore, it may be appreciated that radio resources may be wasted and/or transmission latency may be prolonged as the base station may wait for a retransmission of the primary CSI report message and the secondary CSI report message.

Accordingly, example techniques disclosed herein include a CSI report configuration that causes the UE to include a strongest TRP indicator (STI) associated with the set of CQI values when the UE divides the CSI information into a primary part and a secondary part. For example, when the UE determines that the UE is capable of transmitting all of the CSI information in a single CSI report message, the UE may determine not to include an STI value in the CSI report message.

However, when the UE determines that the UE is unable (or incapable) of transmitting all of the CSI information in a single CSI report message (e.g., determines to divide the CSI information into a primary part and a secondary part), the UE may include, based on the CSI report configuration, an STI value associated with the set of CQI values in the primary CSI report message. That is, the primary CSI report message may include CRI, RI, a set of wideband CQI values associated with the strongest TRP (or TRP groups), an LI associated with the strongest TRP (or TRP groups), and an STI value identifying the strongest TRP (or TRP groups). In some examples, the primary part of the CSI information may also include information regarding the size of the secondary part of the CSI information. For example, the information regarding the size may include the quantity of TRPs (or TRP groups) for which sets of CQI values are included and/or the total number of non-zero coefficients in PMI for each of the TRPs (or TRP groups). In some examples, the primary CSI report message may include information regarding the quantity of secondary CSI report messages.

Furthermore, in some examples, it may be beneficial for the UE to prioritize the information included in the secondary part of the CSI information. For example, due to limited uplink resources, the UE may determine to drop (or not transmit) low priority information of the secondary part of the CSI information. Example techniques disclosed herein enable the UE to group and prioritize the information in the secondary part of the CSI information so that some CSI information may be retained and transmitted (e.g., via the secondary CSI report message) and the remaining CSI information may be dropped or discarded. For example, the UE may determine to retain and transmit high priority CSI information and to drop (or discard) low priority CSI information.

Figure 5:
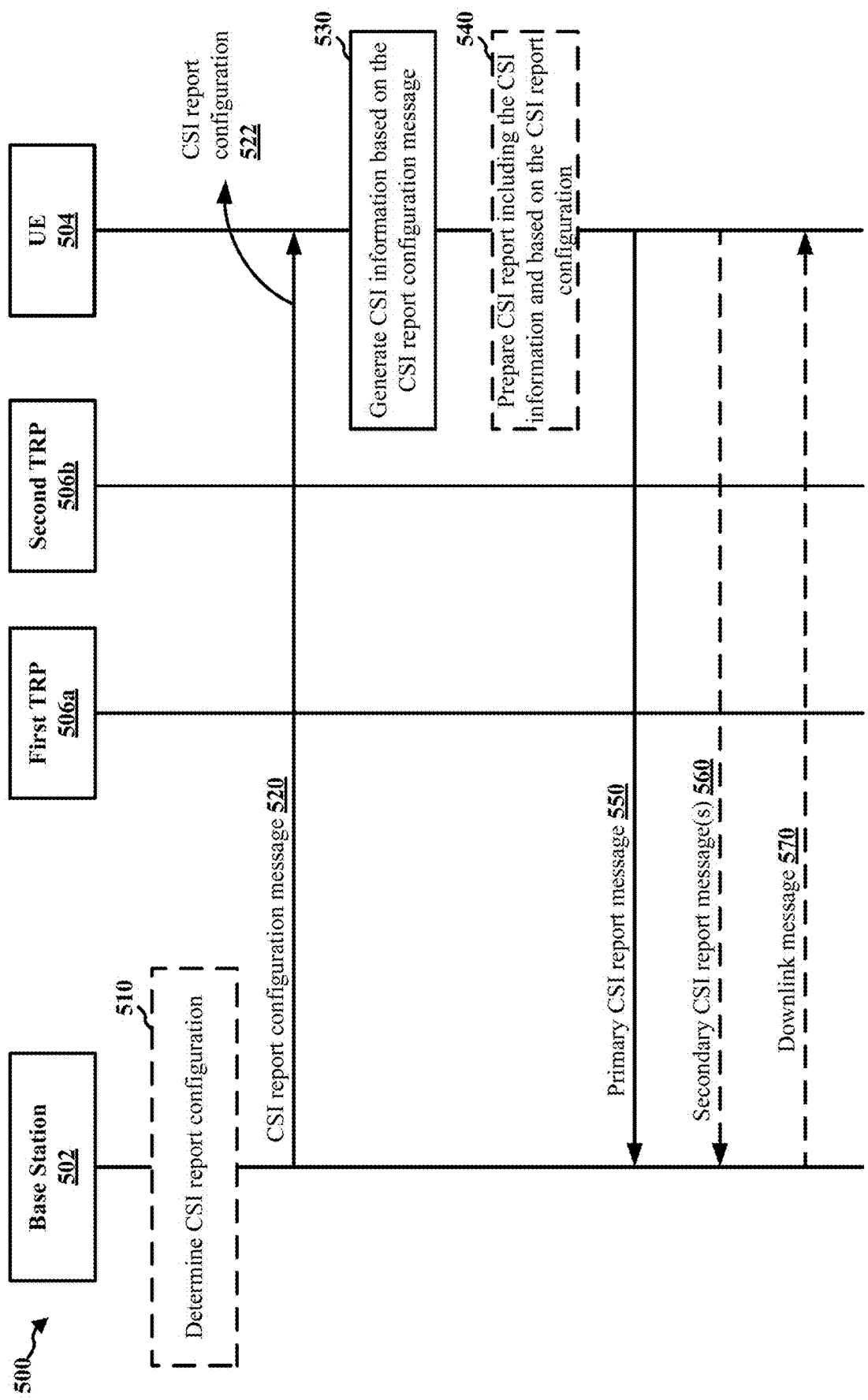
FIG. 5 is a call flow diagram illustrating communications between a base station, a UE, and multiple-TRPs, in accordance with the teachings disclosed herein.

FIG. 5 illustrates an example of wireless communication 500 between a base station 502 and a UE 504, as presented herein. In the illustrated example of FIG. 5, the base station 502 and the UE 504 are operating in a multiple-TRP communication mode in which the base station 502 is connected to two or more TRPs and messages may be communicated between the base station 502 and the UE 504 using one or more of the TRPs. For example, in the illustrated example of FIG. 5, the base station 502 and the UE 504 are connected to and in communication with a first TRP 506a and a second TRP 506b. One or more aspects of the base station 502 may be implemented by the base station 102/180 of FIG. 1, the base station 310 of FIG. 3, and/or the base station 402 of FIG. 4. One or more aspects of the UE 504 may be implemented by the UE 104 of FIG. 1, the UE 350 of FIG. 3, and/or the UE 404 of FIG. 4.

One or more aspects of the TRPs 506a, 506b may be implemented by the TRPs 406a-406c of FIG. 4. In some examples, the TRPs 506a, 506b may correspond to TRPs that facilitate coherent joint transmissions, such as the first TRP 406a and the second TRP 406b. In some examples, the TRPs 506a, 506b may correspond to TRPs that facilitate non-coherent joint transmissions, such as the second TRP 406b and the third TRP 406c (e.g., the TRP group with NCJT 460). Thus, it may be appreciated that a TRP may refer to a particular TRP or to a particular TRP group.

While the wireless communication 500 of FIG. 5 includes a base station 502 in communication with a UE 504 via two TRPs 506a, 506b, in additional or alternative examples, the UE 504 may be in communication with any suitable quantity of base stations and/or TRPs. For example, the UE 504 may be in communication with zero, one, two, or more base stations and/or the UE 504 may be in communication with zero, one, two, or more TRPs. Furthermore, the base station 502 may be in communication with any suitable quantity of other base stations, UEs, and/or TRPs. Additionally, one or both of the TRPs 506a, 506b may be in communication with any suitable quantity of base stations, TRPs, and/or UEs.

It may be appreciated that when a first device transmits a message that is received by a second device, the message may be communicated via one or both of the TRPs 506a, 506b. For example, in the downlink, the base station 502 may transmit a message that is received by the first TRP 506a, the second TRP 506b, or both TRPs 506a, 506b. The first TRP 506a, the second TRP 506b, or both TRPs 506a, 506b may then transmit the message to the UE 504. In a similar manner, in the uplink, the UE 504 may transmit a message that is received by the first TRP 506a, the second TRP 506b, or both TRPs 506a, 506b. The first TRP 506a, the second TRP 506b, or both TRPs 506a, 506b may then transmit the message to the base station 502.

In the illustrated example of FIG. 5, the base station 502 may determine, at 510, a CSI report configuration 522 to provide to the UE 504. As disclosed herein, the CSI report configuration 522 facilitates improving channel estimation between the base station 502 and the UE 504 operating in a multiple-TRP communication mode, such as the example communication system 400 of FIG. 4. In some examples, and as described below, the CSI report configuration 522 may request a multiple-TRP transmission value and/or indicate a configuration of a CSI report generated and transmitted by the UE 504 to the base station 502. For example, the CSI report configuration 522 may indicate to the UE 504 a quantity of LI values to include in the CSI report, may indicate to the UE 504 whether to divide CSI information into two or more parts and to transmit the divided CSI information in respective CSI report messages, and/or may indicate to the UE 504 whether to include a strongest TRP indicator (STI) value in a CSI report. In some examples, the STI value indicates a particular TRP. In some examples, the STI value indicates a particular TRP group.

The base station 502 then transmits a CSI report configuration message 520 that is received by the UE 504. Aspects of the CSI report configuration message 520 may be implemented by a CSI-RS. In the illustrated example, the CSI report configuration message 520 includes the CSI report configuration 522 that the base station 502 determined (e.g., at 510). In some examples, the receiving of the CSI report configuration message 520 by the UE 504 may trigger the UE 504 to perform a channel state feedback procedure. For example, the UE 504 may generate CSI information and transmit a CSI report including the generated CSI information to the base station 502. In some examples, the UE 504 may receive the CSI report configuration message 520 via radio resource control (RRC) signaling, via a medium access control-control element (MAC-CE), and/or via downlink control information (DCI).

After receiving the CSI report configuration message 520 and the CSI report configuration 522, the UE 504 generates, at 530, CSI information based on the CSI report configuration message 520. For example, the UE 504 may perform measurements and generate CSI information including CRI, RI, CQI, PMI, LI, etc. for each TRP and/or TRP group of the multiple-TRPs. In some examples, and as disclosed below, the UE 504 may generate the CSI information based on the CSI report configuration 522. For example, the UE 504 may determine a PMI value for each of the TRPs 506a, 506b and may also determine an LI value for each of the respective PMI values. In some examples, the UE 504 may determine the LI value for a precoding matrix based on the channel response strength of each layer of the precoding matrix indicated by the PMI for each of the TRPs 506a, 506b.

The UE 504 may then prepare, at 540, a CSI report including the CSI information and based on the CSI report configuration 522. For example, the UE 504 may determine to transmit the CSI information generated by the UE 504 (e.g., at 530) in a single CSI report message. In other examples, the UE 504 may determine to divide the CSI information into two or more portions and to transmit the respective portions of the CSI information using two or more CSI report messages. In some examples, the UE 504 may determine the configuration of the CSI report based on the CSI report configuration 522. For example, and as described below, the UE 504 may determine what CSI information to include in the CSI report based on the CSI report configuration 522 and/or may determine whether to divide the CSI information into two parts. For example, the CSI report configuration 522 may indicate to the UE 504 a quantity of LI values to include in the CSI report and/or may include identifiers for one or more of the TRPs for which to include an LI value. In some examples, the CSI report configuration 522 may indicate to the UE 504 whether to divide the CSI information into two parts and to transmit the CSI report using two or more respective messages (e.g., a primary CSI report message and one or more secondary CSI report messages). In some examples, the CSI report configuration 522 may indicate to the UE 504 that when the UE 504 determines to divide the CSI information into two or more parts, the UE 504 is to include an STI value in the primary part of the CSI information and information regarding the quantity of TRPs for which CSI information is generated (e.g., information regarding the size of the secondary part of the CSI information).

In some examples, the UE 504 may determine to divide the CSI information into the primary part and the secondary part based on the available uplink resources and/or the quality of the uplink resources. For example, the UE 504 may determine to divide the CSI information into the two parts when the size of the generated CSI information is greater than a capacity associated with the uplink control channel resources (e.g., due to the available uplink control channel resources and/or due to the measured propagation loss associated with the uplink control channel resources). In some examples, the UE 504 may determine to divide the CSI information into the primary part and the secondary part based on signaling received from the base station 502 (e.g., via the CSI report configuration 522). In some examples, the UE 504 may determine to divide the CSI information into the primary part and the secondary part based on separate signaling between the base station 502 and the UE 504. In some examples, the UE 504 may determine to divide the CSI information into the primary part and the secondary part based on a previous configuration of the UE 504.

The UE 504 may then transmit a primary CSI report message 550 that is received by the base station 502. The UE 504 may also transmit one or more secondary CSI report message(s) 560 that may be received by the base station 502. It may be appreciated that if the UE 504 determines that the generated CSI information may be transmitted in a single CSI report message (e.g., at 540), then the primary CSI report message 550 may correspond to the single CSI report message and that the UE 504 may not transmit (or forego transmitting) the secondary CSI report message 560. The UE 504 may transmit the primary CSI report message 550 and/or the secondary CSI report message(s) 560 using the uplink resources allocated to the UE 504, such as PUCCH or PUSCH.

The primary CSI report message 550 may include the generated CSI information (e.g., at 530). In some examples, the primary CSI report message 550 may include a portion of the CSI information. For example, the primary CSI report message 550 may include the primary part of the CSI information (as determined at 540). When the CSI information is divided into two or more parts, the secondary part of the CSI information may be transmitted by the UE 504, and may be received by the base station 502, via the secondary CSI report message(s) 560.

In some examples, the base station 502 may transmit a downlink message 570 that is received by the UE 504. The base station 502 may transmit the downlink message 570 based on one or more components of the CSI information included in the CSI report message(s) 550, 560. For example, the base station 502 may use the precoding matrix indicated by the PMI to transmit downlink data (e.g., via a downlink data channel, such as PDSCH).

In some examples, the base station 502 may transmit phase-tracking reference signals (PT-RS) based on the layers indicated by the LI value(s) included in the CSI report message(s) 550, 560. For example, the UE 504 may generate a first LI value for the first TRP 506a and may generate a second LI value for the second TRP 506b based on a channel response strength of each layer for the respective TRPs 506a, 506b. The base station 502 may receive the LI value for each of the TRPs 506a, 506b in the CSI report message(s) 550, 560. The base station 502 may then transmit, via the downlink message 570, a PT-RS in a respective layer indicated for each of the TRPs 506a, 506b. In some such examples, the downlink message 570 may include a first PT-RS transmitted to the UE 504 via the first TRP 506a using a layer indicated by the first LI value and may include a second PT-RS transmitted to the UE 504 via the second TRP 506b using a layer indicated by the second LI value. That is, instead of using a same layer, as indicated by a single LI value, to transmit the PT-RSs to the different TRPs 506a, 506b, disclosed techniques enable the base station 502 to use a strongest respective layer, as indicated by different LI values, to transmit the PT-RSs to the different TRPs 506a, 506b. It may be appreciated that the UE 504 may then estimate and mitigate phase noise based on the received PT-RS(s) for each of the TRPs 506a, 506b.

As described above, in some examples, the UE 504 may generate CSI information (e.g., at 530) and/or prepare the CSI report based on the CSI report configuration 522 (e.g., at 540). For example, in some examples, the CSI report configuration 522 may request that the UE 504 provide (or configure the UE 504 to provide) a multiple-TRP transmission value, such as a quantity of LI values in the CSI report when the base station 502 and the UE 504 are operating in a multiple-TRP communication mode. For example, the CSI report configuration 522 may indicate to the UE 504 to include zero LI values, one LI value, or multiple LI values. In some examples, when the CSI report configuration 522 indicates to the UE 504 to include zero LI values, the UE 504 may include no LI values for any of the TRPs 506a, 506b of the multiple-TRP communication system in the CSI report.

In some examples, when the CSI report configuration 522 indicates to (or configures) the UE 504 to include one LI value, the UE 504 includes one LI value in the CSI report. In some examples, the one LI value may correspond to a strongest spatial layer based on the different PMI values. In some examples, the one LI value may correspond to a strongest spatial layer associated with an indicated TRP (or a TRP group). For example, the one LI value may be associated with the first TRP 506a, may be associated with the second TRP 506b, or may be associated with a TRP group. In some such examples, an identifier for the indicated TRP (or TRP group) may be provided to the UE 504 via the CSI report configuration 522 and/or via separate signaling between the base station 502 and the UE 504. In additional or alternative examples, the UE 504 may include the identifier for the TRP (or TRP group) for which the LI value corresponds in the CSI report.

In some examples, when the CSI report configuration 522 indicates to the UE 504 to include multiple LI values, the UE 504 includes two or more LI values in the CSI report. In some such examples, the UE 504 may include the two or more LI values for TRPs (or TRP groups) identified by the base station 502. For example, the base station 502 may include identifiers for the two TRPs 506a, 506b and/or for TRP groups in the CSI report configuration 522 and/or more include the identifiers for the two or more TRPs 506a, 506b or TRP groups via separate signaling between the base station 502 and the UE 504. In additional or alternative examples, the UE 504 may include the identifiers for the TRPs (or TRP groups) for which the LI values correspond in the CSI report.

In some examples in which the CSI report configuration 522 indicates to the UE 504 to include multiple LI values, the UE 504 may determine that the UE 504 is unable to include the multiple LI values in the CSI report. For example, the UE 504 may be unable to include the multiple LI values in the CSI report due to limited uplink resources and/or large propagation loss. In some such examples, the UE 504 may prepare the CSI report (e.g., at 540) by sorting the multiple LI values and dropping those LI values that are determined to be low-priority LI values and/or do not satisfy an LI value priority threshold.

In some examples, the UE 504 may sort the LI values based on the sets of CQI values associated with each TRP (or TRP group). For example, the UE 504 may determine the priority of each LI value, relative to the other LI values, based on a value of the CQI values set for each TRP (or TRP group) (e.g., the strongest CQI value in the set of CQI values). In some such examples, a larger value of the CQI value set for a TRP (or TRP group) may correspond to a higher priority of the corresponding LI value.

In some examples, the multiple-TRPs may be associated with the same CQI values set value. In some such examples, the UE 504 may determine the priority of the respective LI values based on the value of RIs of each TRP (or TRP group). For example, the UE 504 may associate a larger RI value with a higher priority of the corresponding LI value.

In some examples, the multiple-TRPs may be associated with the same CQI values set value and the same RI value. In some such examples, the UE 504 may determine the priority of the respective LI values based on an index of each TRP (or TRP group). For example, the UE 504 may associate a smaller TRP index (or a smaller TRP group index) with a higher priority of the corresponding LI value.

In some examples, the UE 504 may then transmit the respective LI values in the primary CSI report message 550 and/or the secondary CSI report message 560. In this manner, the base station 502 may transmit the downlink message 570 using the respective strongest layer indicated by the LI value for each of the TRPs 506a, 506b (or TRP groups). For example, the base station 502 may transmit a first PT-RS to the UE 504 using a first strongest layer indicated by the LI value for the first TRP 506a (e.g., the first LI value) and may transmit a second PT-RS to the UE 504 using a second strongest layer indicated by the LI value for the second TRP 506b (e.g., the second LI value).

In some examples, the UE 504 may be configured (e.g., pre-configured) to include a strongest TRP indicator (STI) in a CSI report. In some examples, the CSI report configuration 522 may, additionally or alternatively, configure the UE 504 to include the STI in a CSI report. For example, the CSI report configuration 522 may configure the UE 504 to include the STI value in the primary CSI report message 550 when the UE 504 generates CSI information for multiple-TRPs. In some examples, the CSI report configuration 522 may configure the UE 504 to include an STI value in the primary CSI report message 550. For example, when the UE 504 divides the CSI information into two parts (e.g., a primary part and a secondary part), the UE may include the STI value in the primary part of the CSI information, which the UE 504 transmits using the primary CSI report message 550.

For example, the UE 504 may determine a respective set of CQI values for each of the TRPs 506a, 506b (e.g., a first set of CQI values for the first TRP 506a and a second set of CQI values for the second TRP 506b). The UE 504 may then determine an STI value that corresponds to an identifier of the TRP (or TRP group) associated with the largest CQI value. For example, the UE 504 may determine the largest CQI value from the sets of CQI values, determine the TRP (or TRP group) associated with the largest CQI value, and then determine the STI value based on the determined TRP (or TRP group). In some examples, the UE 504 may determine to include the STI value in the primary CSI report message 550 when the CSI information includes two or more sets of CQI values. That is, when the UE 504 generates CSI information for multiple TRPs (e.g., the TRPs 506a, 506b), the UE 504 may include the STI value so that the set of CQI values included in the primary CSI report message 550 may be associated with a respective TRP (or TRP group). In this manner, the base station 502 may transmit the downlink message 570 using the CSI information included in the primary CSI report message 550 and is not dependent on the successful receiving of the secondary CSI report message(s) 560.

In some examples, when the UE 504 determines to divide the CSI information into the primary part and the secondary part, the UE 504 may group and prioritize the CSI information so that high priority information is retained and transmitted (e.g., in the CSI report) and so that low priority information may be dropped (or discarded) (e.g., not transmitted). For example, for each of the TRPs 506a, 506b (or TRP groups), the UE 504 may generate CSI information including CRI, RI, CQI, PMI, LI, etc. The UE 504 may also determine an STI value to identify the strongest TRP of the TRPs 506a, 506b, or a strongest TRP group. As described above, in some examples, the CSI information may be divided into a primary part, which may be transmitted to the base station 502 in the primary CSI report message 550, and a secondary part, which may be transmitted to the base station 502 in the secondary CSI report message(s) 560. The primary part of the CSI information may include relatively high priority information and may be configured with a size that is independent of the quantity of TRPs (or TRP groups) for which the CSI information is generated (e.g., the primary part may be defined by a fixed size). The secondary part of the CSI information may include relatively low priority information and may be configured with a size that varies based on the quantity of TRPs (or TRP groups) for which the CSI information is generated.

In some examples, the information included in the primary part of the CSI information may be configured (or selected) so that the base station 502 may use the CSI information included in the primary CSI report message 550 to determine how and what information to include in the downlink message 570 regardless of whether the base station 502 receives the secondary CSI report message(s) 560. For example, the primary part of the CSI information may include CRI, RI, wideband CQI associated with the strongest TRP (or TRP group), an LI value associated with the strongest TRP (or TRP group), and an STI value identifying the strongest TRP (or TRP group). The primary part of the CSI information may also include information regarding the size of the secondary part of the CSI information. For example, the information regarding the size may include the quantity of TRPs (or TRP groups) and/or a total quantity of non-zero coefficients in the respective PMIs for the TRPs (or TRP groups).

In some examples, the secondary part of the CSI information may include sub-band CQI associated with the strongest TRP (or TRP group), sets of CQI values associated with the remaining TRPs (or TRP group), LI values associated with the remaining TRPs (or TRP group), and PMI values for the TRPs (or TRP groups). Example techniques disclosed herein also enable the UE 504 to prioritize the information included in the secondary part of the CSI information. It may be beneficial to prioritize the information included in the secondary part of the CSI information if, for example, the UE 504 determines that the available uplink resources are insufficient to transmit all of the information included in the secondary part of the CSI information. In some such examples, the UE 504 may group and prioritize the information included in the secondary part of the CSI information so that relatively lower priority information may be dropped (or discarded).

For example, for each TRP (or TRP group), the PMI may be divided and grouped, and the respective groups of PMI information may be prioritized. For example, the PMI may correspond to PMI with frequency-compression or may correspond to PMI without frequency-compression. For PMI with frequency-compression, the PMI information may include wideband PMI information, sub-band PMI information for even sub-bands, or sub-band PMI information for odd sub-bands. For PMI without frequency-compression, the PMI information may include spatial-domain basis information, higher-priority coefficients and frequency-domain basis information, or lower-priority coefficients and frequency-domain basis information.

In some examples, the UE 504 may divide and group the PMI information into three groups. For example, a first grouping (e.g., a PMI group zero) may include wideband PMI information of PMI without frequency-compression or spatial-domain basis information of PMI with frequency-compression. A second grouping (e.g., a PMI group one) may include sub-band PMI information for even sub-bands of PMI without frequency-compression or higher-priority coefficients and frequency-domain basis information of PMI without frequency-compression. A third grouping (e.g., a PMI group two) may include sub-band PMI information for odd sub-bands of PMI without frequency-compression or lower-priority coefficients and frequency-domain basis information.

After the UE 504 divides and groups the PMI information for each TRP into one of the three example PMI groups, the UE 504 may prioritize the respective groups for each TRP. In some examples, the priority order for the different PMI groups may vary based on, for example, signaling between the base station 502 and the UE 504 (e.g., based on the CSI report configuration 522 and/or separate signaling), may be pre-configured, and/or may be regulated by a standard.

In a first example PMI priority order variation, the PMI group zero for each TRP (or TRP group) may have the highest priority, followed by the PMI group one for each TRP (or TRP group), and followed by the PMI group two for each TRP (or TRP group). For example, the PMI information may be prioritized (from highest to lowest) as: (1) the PMI group zero of the first TRP 506a (or a first TRP group), (2) the PMI group zero of the second TRP 506b (or a second TRP group), (3) the PMI group one of the first TRP 506a (or the first TRP group), (4) the PMI group one of the second TRP 506b (or the second TRP group), (5) the PMI group two of the first TRP 506a (or the first TRP group), and (6) the PMI group two of the second TRP 506b (or the second TRP group).

In a second example PMI priority order variation, each PMI group of a first TRP (or a first TRP group) may have the highest priority, followed by each PMI group of a second TRP (or a second TRP group), etc. For example, the PMI information may be prioritized (from highest to lowest) as: (1) the PMI group zero of the first TRP 506a (or the first TRP group), (2) the PMI group one of the first TRP 506a (or the first TRP group), (3) the PMI group two of the first TRP 506a (or the first TRP group), (4) the PMI group zero of the second TRP 506b (or the second TRP group), (5) the PMI group one of the second TRP 506b (or the second TRP group), and (6) the PMI group two of the second TRP 506b (or the second TRP group).

In a third example PMI priority order variation, the PMI group zero of each TRP may have the highest priority, followed by the remaining PMI groups of a first TRP (or a first TRP group) (e.g., the PMI group one and the PMI group two), followed by the remaining PMI groups of a second TRP (or a second TRP group), etc. For example, the PMI information may be prioritized (from highest to lowest) as: (1) the PMI group zero of the first TRP 506a (or the first TRP group), (2) the PMI group zero of the second TRP 506b (or the second TRP group), (3) the PMI group one of the first TRP 506a (or the first TRP group), (4) the PMI group two of the first TRP 506a (or the first TRP group), (5) the PMI group one of the second TRP 506b (or the second TRP group), and (6) the PMI group two of the second TRP 506b (or the second TRP group).

However, it may be appreciated that other examples may include additional or alternative techniques for dividing and grouping the PMI information and/or for prioritizing the PMI groups.

In some examples, after the UE 504 divides and groups the PMI information and prioritizes the PMI groups (e.g., based on the PMI priority order variations), the UE 504 may transmit the PMI information in the one or more secondary CSI report message(s) 560 so that the higher priority PMI information may be retained and transmitted and so that lower priority PMI information may be dropped (or discarded). Thus, it may be appreciated that whether PMI information is retained and transmitted or dropped (or discarded) may be determined based on the priority of the PMI information (e.g., based on the grouping and the PMI priority order variation used) and the uplink resources available for transmitting the PMI information.

FIGS. 6 to 9 are flowcharts of methods of wireless communication. The methods may be performed by a UE (e.g., the UE 104, the UE 350, and/or an apparatus 1002 of FIG. 10). According to various aspects, one or more of the illustrated operations of the methods may be omitted, transposed, and/or contemporaneously performed. Optional aspects are illustrated with a dashed line. The methods may enable a UE to transmit a CSI report including requested LI values and/or an STI value while operating in a multiple-TRP communication mode.

Figure 6:
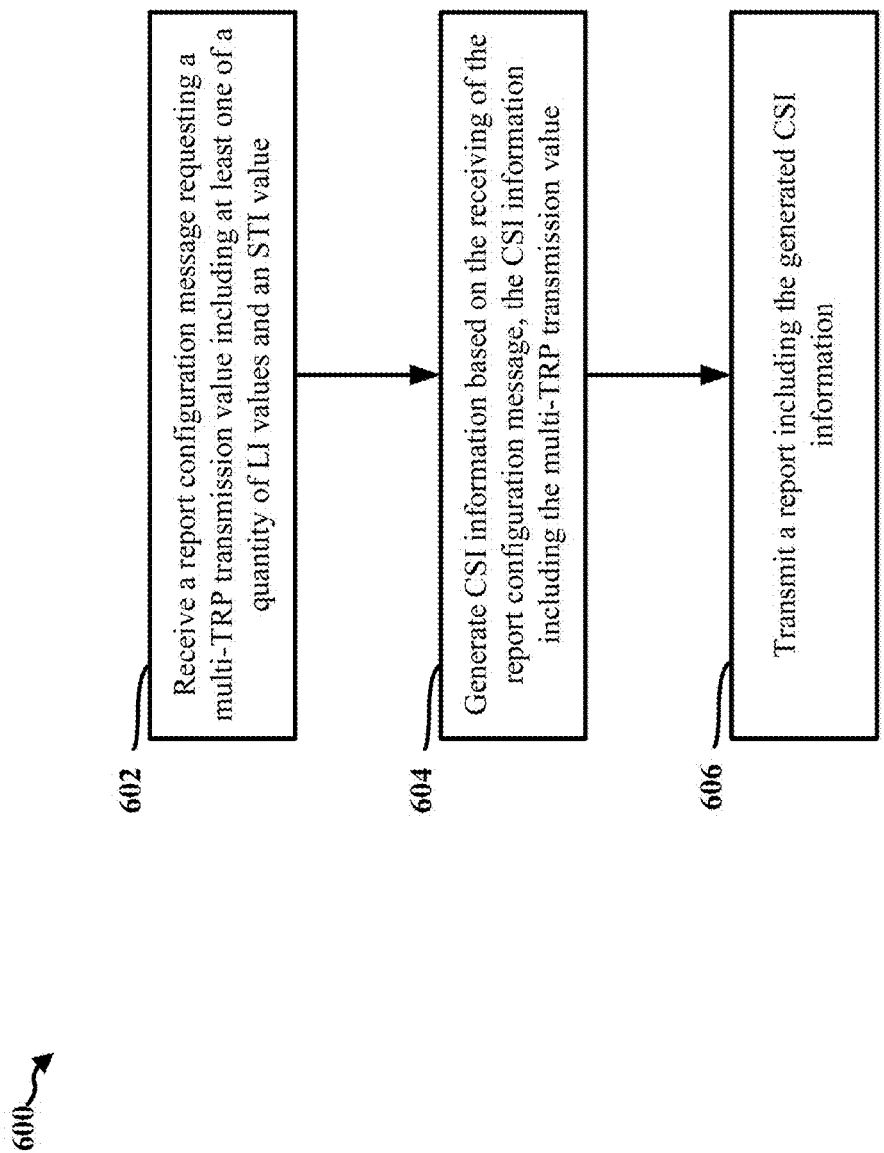
FIG. 6 is a flowchart of a method of wireless communication at a UE, in accordance with the teachings disclosed herein.

FIG. 6 is a flowchart 600 of a method of wireless communication of a UE. At 602, the UE receives a report configuration message requesting a multiple-TRP transmission value including at least one of a quantity of LI values and an STI value, as described above in connection with the CSI report configuration 522 of FIG. 5. For example, 602 may be performed by report configuration reception component 1040 of the apparatus 1002 of FIG. 10. In some examples, the report configuration message may trigger the performing of a channel state feedback procedure. In some examples, the report configuration message may be received in at least one of RRC signaling, a MAC-CE, and DCI.

At 604, the UE generates CSI information based on the receiving of the report configuration message, the CSI information including the multiple-TRP transmission value, as described above in connection with 530 and/or 540 of FIG. 5. For example, 604 may be performed by a CSI generation component 1042 of the apparatus 1002 of FIG. 10.

Finally, at 606, the UE transmits a report including the generated CSI information, as described above in connection with the CSI report messages 550, 560 of FIG. 5. For example, 606 may be performed by a report transmission component 1044 of the apparatus 1002 of FIG. 10.

Figure 7:
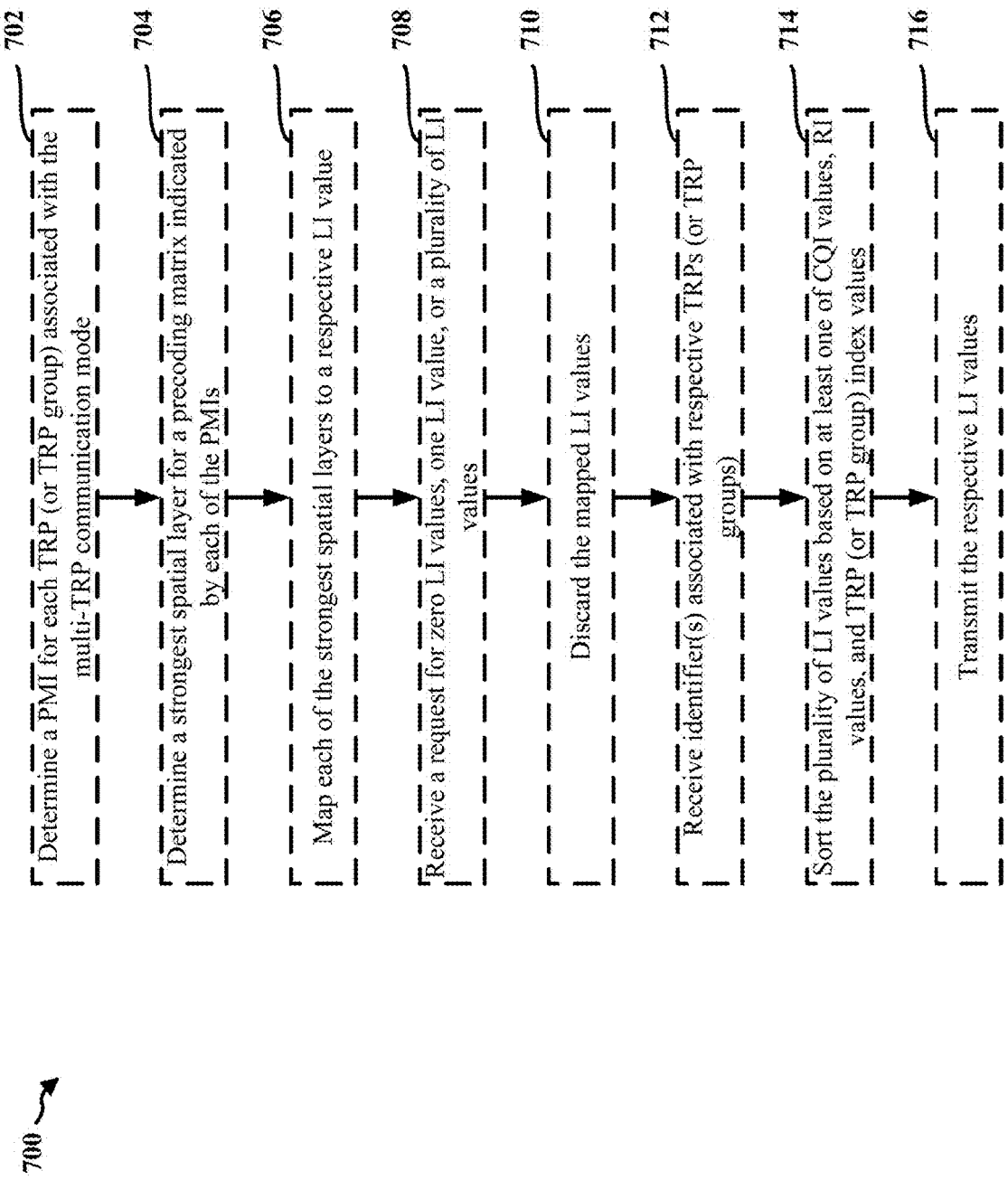
FIG. 7 is a flowchart of a method of wireless communication at a UE in which a multiple-TRP transmission value corresponds to LI values, in accordance with the teachings disclosed herein.
Figure 8:
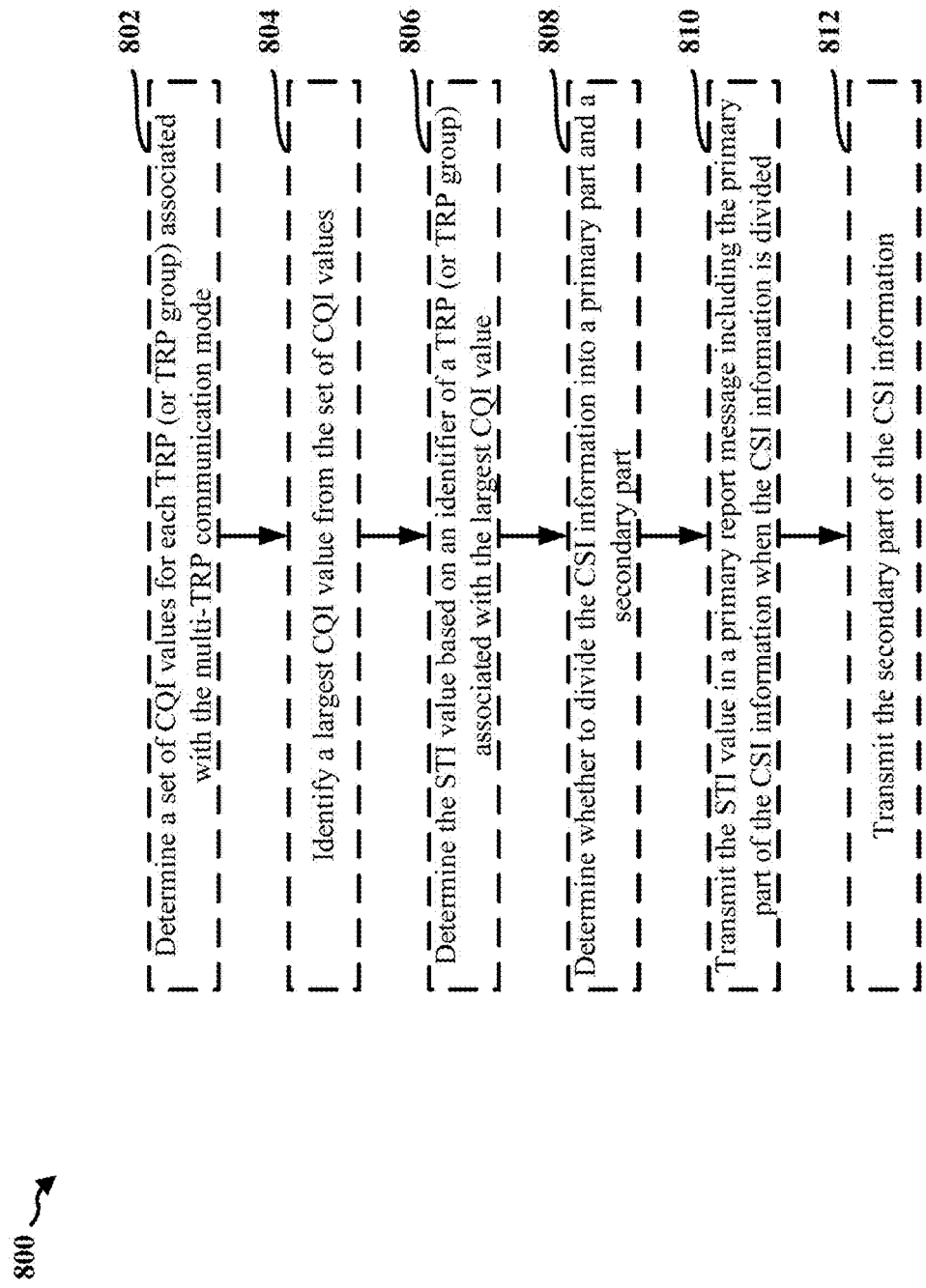
FIG. 8 is a flowchart of a method of wireless communication at a UE in which CSI information may be divided into a primary part and a secondary part, in accordance with the teachings disclosed herein.
Figure 9:
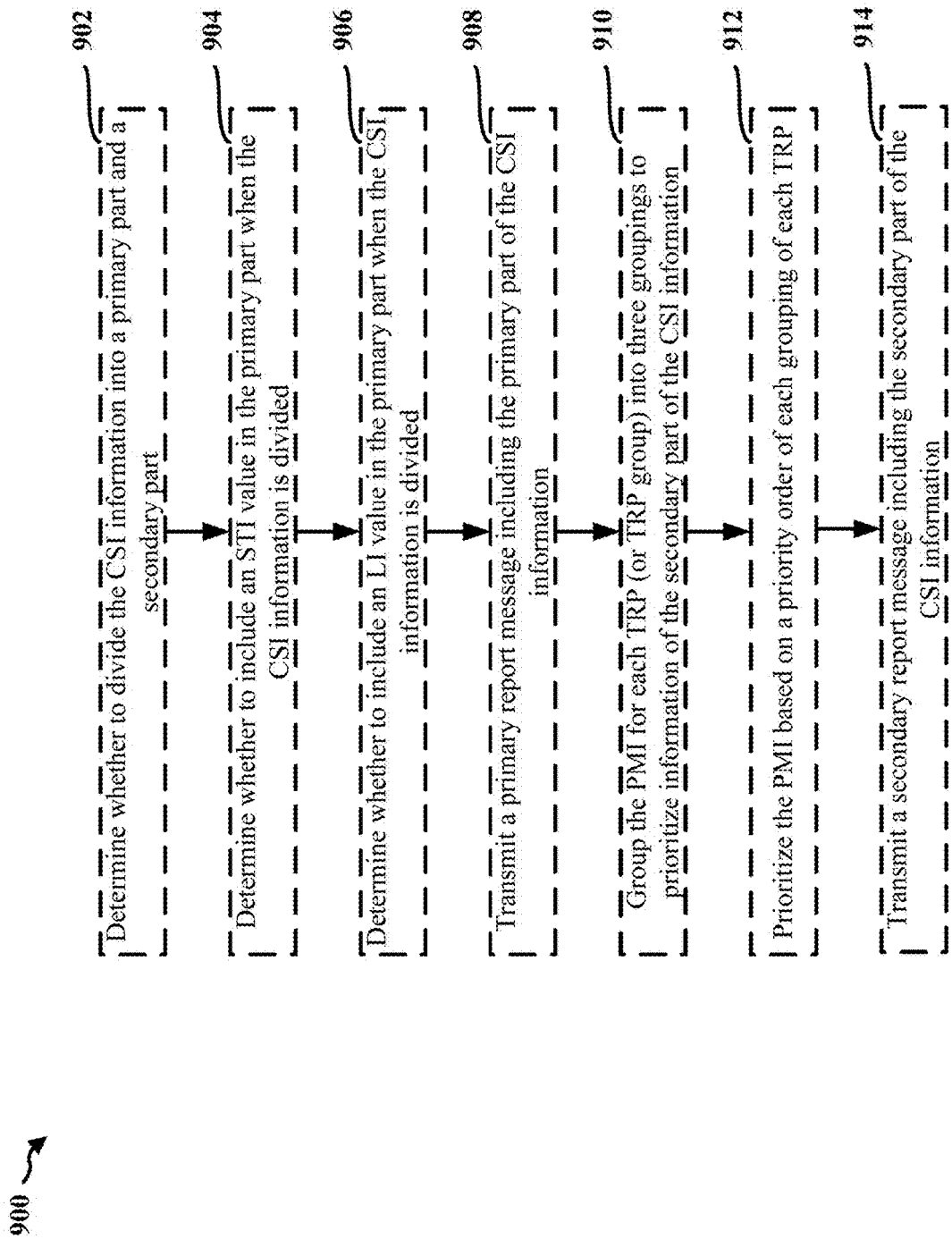
FIG. 9 is a flowchart of a method of wireless communication at a UE in which the UE prioritizes information included in a secondary part of CSI information, in accordance with the teachings disclosed herein.

Aspects of generating the CSI information including the multiple-TRP transmission value and transmitting the report including the generated CSI information are described in FIGS. 7 to 9.

FIG. 7 is a flowchart 700 of a method of wireless communication in which the multiple-TRP transmission value corresponds to LI values. At 702, the UE may determine a PMI for each TRP (or TRP group) associated with the multiple-TRP communication mode, as described above in connection with 530 of FIG. 5. For example, 702 may be performed by the CSI generation component 1042 of the apparatus 1002 of FIG. 10.

At 704, the UE may determine a strongest spatial layer for a precoding matrix indicated by each of the PMIs. For example, 704 may be performed by a PMI handling component 1046 of the apparatus 1002 of FIG. 10.

At 706, the UE may map each of the strongest spatial layers to a respective LI value.

Figure 10:
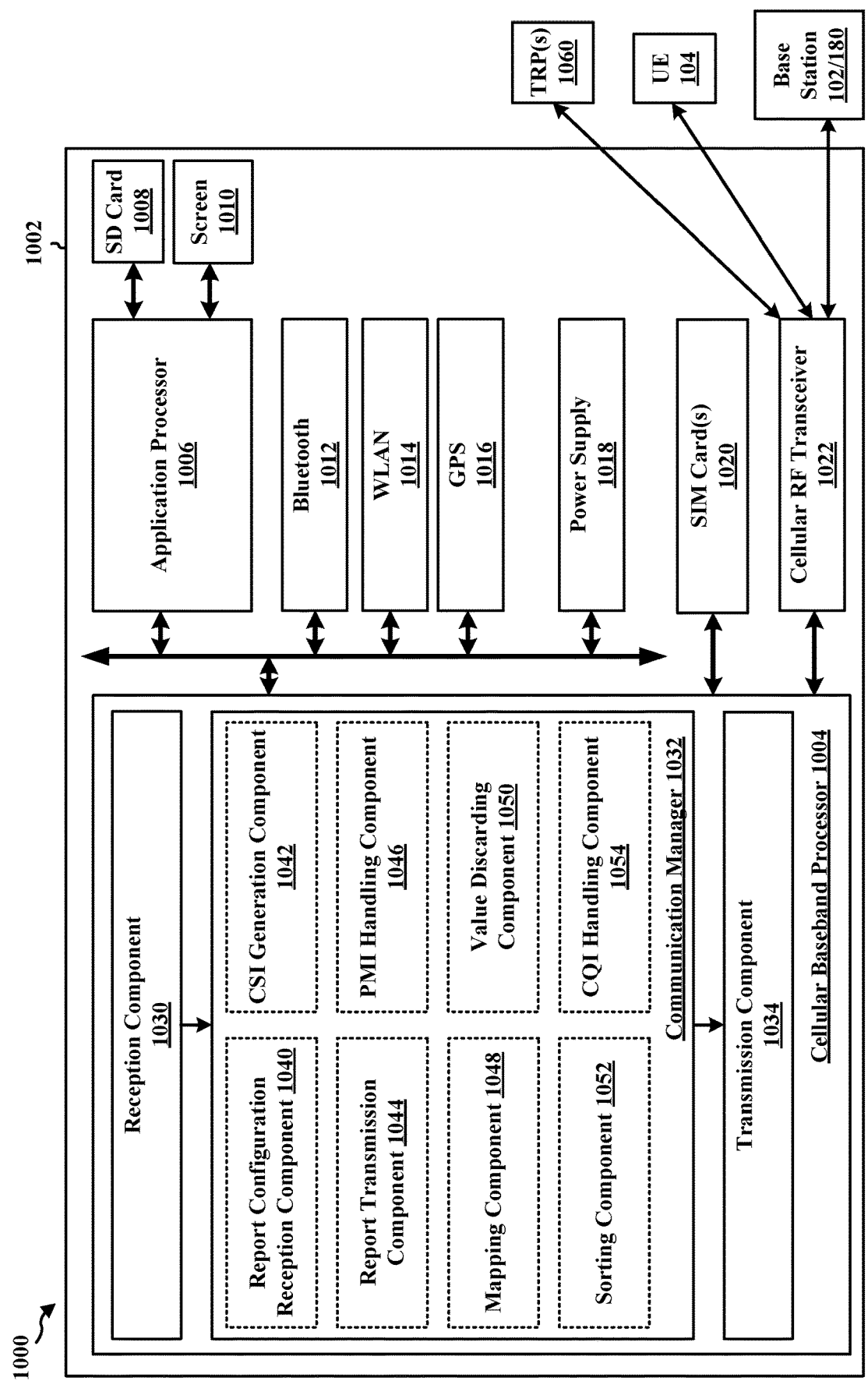
FIG. 10 is a diagram illustrating an example of a hardware implementation for an example apparatus, in accordance with the teachings disclosed herein.

For example, 706 may be performed by a mapping component 1048 of the apparatus 1002 of FIG. 10.

At 708, the UE may receive a request for zero LI values, one LI values, or a plurality of LI values. In some examples, the request for the respective quantity of LI values may be included in the report configuration message. For example, 708 may be performed by the report configuration reception component 1040 of the apparatus 1002 of FIG. 10.

In some examples in which the report configuration message includes a request for zero LI value, the UE may discard, at 710, the mapped LI values, as described in connection with 540 of FIG. 5. For example, 710 may be performed by a value discarding component 1050 of the apparatus 1002 of FIG. 10.

In some examples in which the report configuration message includes a request for one LI value or a plurality of LI values, the UE may receive, at 712, identifier(s) associated with respective TRPs (or TRP groups), as described in connection with the CSI report configuration 522 of FIG. 5. For example, if the report configuration message includes a request for one LI value, the UE may receive an identifier for a first TRP (or a first TRP group). If the report configuration message includes a request for a plurality of LI values, the UE may receive respective identifiers for a plurality of TRPs (or a plurality of TRP groups). In some examples, the identifier(s) associated with the respective TRPs (or respective TRP groups) may be included in the report configuration message. For example, 712 may be performed by the report configuration reception component 1040 of the apparatus 1002 of FIG. 10.

In some examples in which the report configuration message includes a request for a plurality of LI values, the UE may sort, at 714, the plurality of LI values based on at least one of CQI values, RI values, and TRP index values, as described in connection with 540 of FIG. 5. In some examples, the UE may sort the plurality of LI values based on CQI values by, for example, ranking a first LI value associated with a first TRP (or a first TRP group) as higher priority than a second LI value associated with a second TRP (or a second TRP group) when a first CQI value associated with the first TRP (or the first TRP group) is a greater CQI value than a second CQI value associated with the second TRP (or the second TRP group). In some examples, the UE may sort the plurality of LI values based on CQI values and RI values by, for example, ranking the first LI value as higher priority than the second LI value when the first CQI value and the second CQI value are the same and a first RI value associated with the first TRP (or the first TRP group) is a greater RI value than a second RI value associated with the second TRP (or the second TRP group). In some examples, the UE may sort the plurality of LI values based on CQI values, RI values, and TRP (or TRP group) index values by ranking the first LI value as higher priority than the second LI value when the first CQI value and the second CQI value are the same, the first RI value and the second RI value are the same, and a first TRP index value associated with the first TRP (or the first TRP group) is a smaller index value than a second TRP index value associated with the second TRP (or the second TRP group). For example, 714 may be performed by a sorting component 1052 of the apparatus 1002 of FIG. 10.

At 716, the UE may transmit the respective LI values, as described in connection with the CSI report messages 550, 560 of FIG. 5. In some examples, the UE may transmit a subset of the respective LI values. For example, due to limited uplink resources, the UE may transmit the LI values based on their respective priorities. For example, 716 may be performed by the report transmission component 1044 of the apparatus 1002 of FIG. 10.

FIG. 8 is a flowchart 800 of a method of wireless communication in which the CSI information may be divided into a primary part and a secondary part.

At 802, the UE may determine a set of CQI values for each TRP (or TRP group) associated with the multiple-TRP communication mode, as described above in connection with 530 of FIG. 5. For example, 802 may be performed by the CSI generation component 1042 of the apparatus 1002 of FIG. 10.

At 804, the UE may identify a largest CQI value from the set of CQI values, as described in connection with 540 of FIG. 5. For example, 804 may be performed by a CQI handling component 1054 of the apparatus 1002 of FIG. 10.

At 806, the UE may determine the STI value based on an identifier of a TRP (or a TRP group) associated with the largest CQI value, as described in connection with 540 of FIG. 5. For example, 806 may be performed by the mapping component 1048 of the apparatus 1002 of FIG. 10.

At 808, the UE may determine whether to divide the CSI information into a primary part and a secondary part, as described above in connection with 540 of FIG. 5. In some examples, the determining of whether to divide the CSI information into the primary part and the secondary part may be based on at least one of uplink resources and a request indicated by the report configuration message. In some examples, the primary part of the CSI information may include at least one of the STI value, the set of CQI values associated with the TRP indicated by the STI value, and information regarding a size of the secondary part of the CSI information. In some examples, the secondary part of the CSI information may include a PMI for each TRP associated with the multiple-TRP communication mode. For example, 808 may be performed by the sorting component 1052 of the apparatus 1002 of FIG. 10.

At 810, the UE may transmit the STI value in a primary report message including the primary part of the CSI information when the CSI information is divided, as described above in connection with the primary CSI report message 550 of FIG. 5. For example, 810 may be performed by the report transmission component 1044 of the apparatus 1002 of FIG. 10.

At 812, the UE may transmit the secondary part of the of CSI information, as described above in connection with the one or more secondary CSI report message(s) 560 of FIG. 5. In some examples, the UE may transmit a subset of the secondary part of the CSI information. For example, due to limited uplink resources, the UE may transmit the PMI information based on their respective priorities. For example, 812 may be performed by the report transmission component 1044 of the apparatus 1002 of FIG. 10.

FIG. 9 is a flowchart 900 of a method of wireless communication in which the UE prioritizes information included in the secondary part of the CSI information.

At 902, the UE may determine whether to divide the CSI information into a primary part and a secondary part, as described above in connection with 540 of FIG. 5. For example, 902 may be performed by the sorting component 1052 of the apparatus 1002 of FIG. 10.

In some examples, the determining of whether to divide the CSI information into the primary part and the secondary part may be based on at least one of uplink resources and a request indicated by the report configuration message. In some examples, the primary part of the CSI information may be configured with a static size (e.g., a size that does not change based on the quantity of TRPs (or TRP groups) for which CSI information is generated) and the secondary part of the CSI information may be configured with a dynamic size (e.g., a size that varies based on the quantity of TRPs (or TRP groups) for which CSI information is generated). In some examples, the primary part of the CSI information may include at least one of a CRI, an RI value, and a wideband CQI value associated with a strongest TRP (or TRP group). In some examples, the primary part of the CSI information may also include information regarding a size of the secondary part of the CSI information. In some examples, the secondary part of the CSI information may include a PMI for each TRP (or TRP group) associated with the multiple-TRP communication mode.

At 904, the UE may determine whether to include the STI value in the primary part of the CSI information when the CSI information is divided, as described in connection with 540 of FIG. 5. For example, 904 may be performed by the sorting component 1052 of the apparatus 1002 of FIG. 10. In some examples, the UE may determine to include the STI value in the primary part of the CSI information when the CSI information includes a plurality of sets of CQI values.

At 906, the UE may determine whether to include an LI value associated with the strongest TRP when the CSI information is divided, as described in connection with 540 of FIG. 5. For example, 906 may be performed by the sorting component 1052 of the apparatus 1002 of FIG. 10. In some examples, the UE may determine to include the LI value associated with the strongest TRP when the RI value of the precoding matrix indicated by the PMI associated with the strongest TRP is greater than one (e.g., the quantity of layers of the indicated precoding matrix is greater than one). In some examples, the UE may include the LI value when the strongest TRP is also a TRP for which an identifier was provided by the base station.

At 908, the UE may transmit a primary report message including the primary part of the CSI information, as described above in connection with the primary CSI report message 550 of FIG. 5. For example, 908 may be performed by the report transmission component 1044 of the apparatus 1002 of FIG. 10.

At 910, the UE may group the PMI information for each TRP (or TRP group) into three groupings to prioritize the information of the secondary part of the CSI information, as described above in connection with 540 of FIG. 5. For example, 910 may be performed by the PMI handling component 1046 of the apparatus 1002 of FIG. 10.

In some examples, the PMI may be transmitted without frequency-compression or may be transmitted without frequency-compression. In some examples in which the PMI is transmitted without frequency-compression, the PMI may include wideband PMI information, sub-band PMI information for even sub-bands, and sub-band PMI information for odd sub-bands. In some examples in which the PMI is transmitted with frequency-compression, the PMI may include spatial-domain basis information, higher-priority coefficients and frequency-domain basis information, and lower-priority coefficients and frequency-domain basis information.

In some examples, the UE may prioritize the PMI for each TRP (or TRP group) based on a first grouping, a second grouping, and a third grouping. For example, the first grouping may include wideband PMI information or spatial-domain basis information, the second grouping may include sub-band PMI information for even sub-bands or higher-priority coefficients and frequency-domain basis information, and the third grouping may include sub-band PMI information for odd sub-bands or lower-priority coefficients and frequency-domain basis information.

At 912, the UE may prioritize the PMI based on a priority order for each grouping of each TRP (or TRP group). In some examples, the priority order may be indicated by the report configuration message. For example, 912 may be performed by the PMI handling component 1046 of the apparatus 1002 of FIG. 10.

In a first example priority order variation, the UE may associate a first priority level to the first groupings of each TRP (or TRP group), associate a second priority level to the second groupings of each TRP (or TRP group), and associate a third priority level to the third groupings of each TRP (or TRP group). In some such examples, the first priority level may be a highest priority level, followed by the second priority level, which is followed by the third priority level (e.g., the second priority level is greater than the third priority level and less than the first priority level). For example, the first grouping (e.g., the PMI group zero) for each TRP (or TRP group) may have the highest priority, followed by the second grouping (e.g., the PMI group one) for each TRP (or TRP group), and followed by the third grouping (e.g., the PMI group two) for each TRP (or TRP group).

In a second example priority order variation, the UE may associate a first priority level to the groupings of a first TRP (or a first TRP group) and associate a lower priority level to the groupings of a second TRP (or a second TRP group). For example, the groupings of a first TRP (or the first TRP group) (e.g., the PMI group zero, the PMI group one, and the PMI group two associated with the first TRP or the first TRP group) may have the highest priority, followed by the grouping of a second TRP (or a second TRP group) (e.g., the PMI group zero, the PMI group one, and the PMI group two associated with the second TRP or the second TRP group), etc.

In a third example priority order variation, the UE may associate a first priority level to the first grouping of each TRP (or TRP group), associate a second priority level to the second grouping and the third grouping of a first TRP (or a first TRP group), and associate a third priority level to the second grouping and the third grouping of a second TRP (or a second TRP group). In some such examples, the first priority level may be a highest priority level, followed by the second priority level, which is followed by the third priority level (e.g., the second priority level is greater than the third priority level and less than the first priority level). For example, the first grouping (e.g., the PMI group zero) of each TRP (or TRP group) may have the highest priority, followed by the remaining two groupings of a first TRP (or the first TRP group) (e.g., the PMI group one and the PMI group two), followed by the remaining groupings of a second TRP (or the second TRP group), etc.

At 914, the UE may transmit the secondary part of the of CSI information, as described above in connection with the one or more secondary CSI report message(s) 560 of FIG. 5. For example, 914 may be performed by the report transmission component 1044 of the apparatus 1002 of FIG. 10. In some examples, the UE may transmit a subset of the secondary part of the CSI information. For example, due to limited uplink resources, the UE may transmit the PMI information based on their respective priorities.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104, the base station 102/180, and/or one or more TRP(s) 1060. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see the UE 350 of FIG. 3) and include the additional modules of the apparatus 1002.

The communication manager 1032 includes a report configuration reception component 1040 that is configured to receive a report configuration message requesting a multiple-TRP transmission value including at least one of a quantity of LI values and an STI value, for example, as described in connection with 602 of FIG. 6. The report configuration reception component 1040 may also be configured to receive a request for zero LI values, one LI values, or a plurality of LI values. The report configuration reception component 1040 may also be configured to receive identifier(s) associated with respective TRPs (or TRP groups), for example, as described in connection with 712 of FIG. 7.

The communication manager 1032 also includes a CSI generation component 1042 that is configured to generate CSI information based on the receiving of the report configuration message, for example, as described in connection with 604 of FIG. 6. The CSI generation component 1042 may also be configured to determine a PMI for each TRP (or TRP group) associated with the multiple-TRP communication mode, for example, as described in connection with 702 of FIG. 7. The CSI generation component 1042 may also be configured to determine a set of CQI values for each TRP (or TRP group) associated with the multiple-TRP communication mode, for example, as described in connection with 802 of FIG. 8.

The communication manager 1032 also includes a report transmission component 1044 that is configured to transmit a report including the generated CSI information, for example, as described in connection with 606 of FIG. 6. The report transmission component 1044 may also be configured to transit the respective LI values, for example, as described in connection with 716 of FIG. 7. The report transmission component 1044 may also be configured to transmit the STI value in a primary report message including the primary part of the CSI information when the CSI information is divided, for example, as described in connection with 810 of FIG. 8. The report transmission component 1044 may also be configured to transmit the secondary part of the of CSI information, for example, as described in connection with 812 of FIG. 8. The report transmission component 1044 may also be configured transmit a primary report message including the primary part of the CSI information, for example, as described in connection with 908 of FIG. 9. The report transmission component 1044 may also be configured to transmit the secondary report message including the secondary part of the CSI, for example, as described in connection with 914 of FIG. 9.

The communication manager 1032 also includes a PMI handling component 1046 that is configured to determine a PMI for each TRP associated with the multiple-TRP communication mode, for example, as described in connection with 702 of FIG. 7. The PMI handling component 1046 may also be configured to determine a strongest spatial layer for a precoding matrix indicated by each of the PMIs, for example, as described in connection with 704 of FIG. 7. The PMI handling component 1046 may also be configured to group the PMI information for each TRP into three groupings to prioritize the information of the secondary part of the CSI information, for example, as described in connection with 910 of FIG. 9. The PMI handling component 1046 may also be configured to prioritize the PMI based on a priority order for each grouping of each TRP (or TRP group), for example, as described in connection with 912 of FIG. 9.

The communication manager 1032 also includes a mapping component 1048 that is configured to map each of the strongest spatial layers to a respective LI value, for example, as described in connection with 706 of FIG. 7. The mapping component 1048 may also be configured to determine the STI value based on an identifier of a TRP (or a TRP group) associated with the largest CQI value, for example, as described in connection with 806 of FIG. 8.

The communication manager 1032 also includes a value discarding component 1050 that is configured to discard the mapped LI values, for example, as described in connection with 710 of FIG. 7.

The communication manager 1032 also includes a sorting component 1052 that is configured to sort the plurality of LI values based on at least one of CQI values, RI values, and TRP index values, for example, as described in connection with 714 of FIG. 7. The sorting component 1052 may also be configured to determine whether to divide the CSI information into a primary part and a secondary part, for example, as described in connection with 808 of FIG. 8.

The sorting component 1052 may also be configured to determine whether to divide the CSI information into a primary part and a secondary part, for example, as described in connection with 902 of FIG. 9.

The sorting component 1052 may also be configured to determine whether to include the STI value in the primary part of the CSI information when the CSI information is divided, for example, as described in connection with 904 of FIG. 9.

The sorting component 1052 may also be configured to determine whether to include an LI value associated with the strongest TRP when the CSI information is divided, for example, as described in connection with 906 of FIG. 9.

The communication manager 1032 also includes a CQI handling component 1054 that is configured to identify a largest CQI value from the set of CQI values, for example, as described in connection with 804 of FIG. 8.

The apparatus may include additional components that perform each of the blocks of the algorithm in the aforementioned flowcharts of FIGS. 6 to 9. As such, each block in the aforementioned flowcharts of FIGS. 6 to 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, a report configuration message triggering a channel state feedback procedure, the UE and the base station operating in a multiple transmission and reception point (multiple-TRP) communication mode, the report configuration message requesting a multiple-TRP transmission value including at least one of a quantity of layer indicator (LI) values and a strongest TRP indicator (STI) value. The example apparatus 1002 also includes means for generating channel state information (CSI) information based on the receiving of the report configuration message, the CSI information including the multiple-TRP transmission value. The example apparatus 1002 also includes means for transmitting, to the base station, a report including the generated CSI information.

In another configuration, the example apparatus 1002 also includes means for determining a precoding matrix indicator (PMI) for each TRP or TRP group associated with the multiple-TRP communication mode. The example apparatus 1002 also includes means for determining a strongest spatial layer for a precoding matrix indicated by each of the PMIs.

The example apparatus 1002 also includes means for mapping each of the strongest spatial layers to a respective LI value.

In another configuration, the example apparatus 1002 also includes means for discarding the mapped LI values when the transmitting of the report includes zero LI values.

In another configuration, the example apparatus 1002 also includes means for receiving an identifier associated with a first TRP or a first TRP group. The example apparatus 1002 also includes means for transmitting the LI value associated with the first TRP or the first TRP group.

In another configuration, the example apparatus 1002 also includes means for receiving respective identifiers associated with a plurality of TRPs or a plurality of TRP groups. The example apparatus 1002 also includes means for transmitting the LI values associated with the plurality of TRPs or the plurality of TRP groups.

In another configuration, the example apparatus 1002 also includes means for sorting the plurality of LI values based on at least one of channel quality indicator (CQI) values, rank indicator (RI) values, and TRP index values.

In another configuration, the example apparatus 1002 also includes means for ranking a first LI value associated with a first TRP as higher priority than a second LI value associated with a second TRP when a first CQI value associated with the first TRP is a greater CQI value than a second CQI value associated with the second TRP.

In another configuration, the example apparatus 1002 also includes means for ranking the first LI value as higher priority than the second LI value when the first CQI value and the second CQI value are a same CQI value and a first RI value associated with the first TRP is a greater RI value than a second RI value associated with the second TRP.

In another configuration, the example apparatus 1002 also includes means for ranking the first LI value as higher priority than the second LI value when the first CQI value and the second CQI value are the same CQI value, the first RI value and the second RI value are a same RI value, and a first TRP index value associated with the first TRP is a smaller index value than a second TRP index value associated with the second TRP.

In another configuration, the example apparatus 1002 also includes means for determining a set of channel quality indicator (CQI) values for each TRP or TRP group associated with the multiple-TRP communication mode. The example apparatus 1002 also includes means for identifying a largest CQI value from a plurality of sets of CQI values. The example apparatus 1002 also includes means for determining the STI value based on an identifier of a TRP or a TRP group associated with the largest CQI value.

In another configuration, the example apparatus 1002 also includes means for determining whether to divide the CSI information into a primary part and a secondary part. The example apparatus 1002 also includes means for transmitting the STI value in a primary report message when the CSI information is divided into the primary part and the secondary part, the primary report message configured to include the primary part of the CSI information.

In another configuration, the example apparatus 1002 also includes means for determining whether to divide the CSI information into a primary part and a secondary part. The example apparatus 1002 also includes means for transmitting the primary part of the CSI information in a primary report message, wherein the primary part of the CSI information includes at least one of a CSI reference signal resource indicator (CRI), a rank indicator (RI) value, and a wideband channel quality indicator (CQI) value associated with a TRP or a TRP group.

In another configuration, the example apparatus 1002 also includes means for prioritizing the PMI for each TRP or TRP group based on a first grouping, a second grouping, and a third grouping, wherein the first grouping includes wideband PMI information or spatial-domain basis information, the second grouping includes sub-band PMI information for even sub-bands or higher-priority coefficients and frequency-domain basis information, and the third grouping includes sub-band PMI information for odd sub-bands or lower-priority coefficients and frequency-domain basis information.

In another configuration, the example apparatus 1002 also includes means for includes associating a first priority level to the first grouping of each TRP or TRP group, associating a second priority level to the second grouping of each TRP or TRP group, and associating a third priority level to the third grouping of each TRP or TRP group, wherein the second priority level is greater than the third priority level and less than the first priority level.

In another configuration, the example apparatus 1002 also includes means for associating a first priority level to the first grouping, the second grouping, and the third grouping of a first TRP or a first TRP group, and associating a lower priority level to the first grouping, the second grouping, and the third grouping of a second TRP or a second TRP group.

In another configuration, the example apparatus 1002 also includes means for associating a first priority level to the first grouping of each TRP or TRP group, associating a second priority level to the second grouping and the third grouping of a first TRP or a first TRP group, and associating a third priority level to the second grouping and the third grouping of a second TRP or a second TRP group, wherein the second priority level is greater than the third priority level and less than the first priority level.

In another configuration, the example apparatus 1002 also includes means for receiving the report configuration message in at least one of radio resource control (RRC) signaling, a medium access control (MAC) control element (CE), and downlink control information.

The aforementioned means may be one or more of the aforementioned components of the apparatus 1002 configured to perform the functions recited by the aforementioned means. As described supra, the apparatus 1002 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 11:
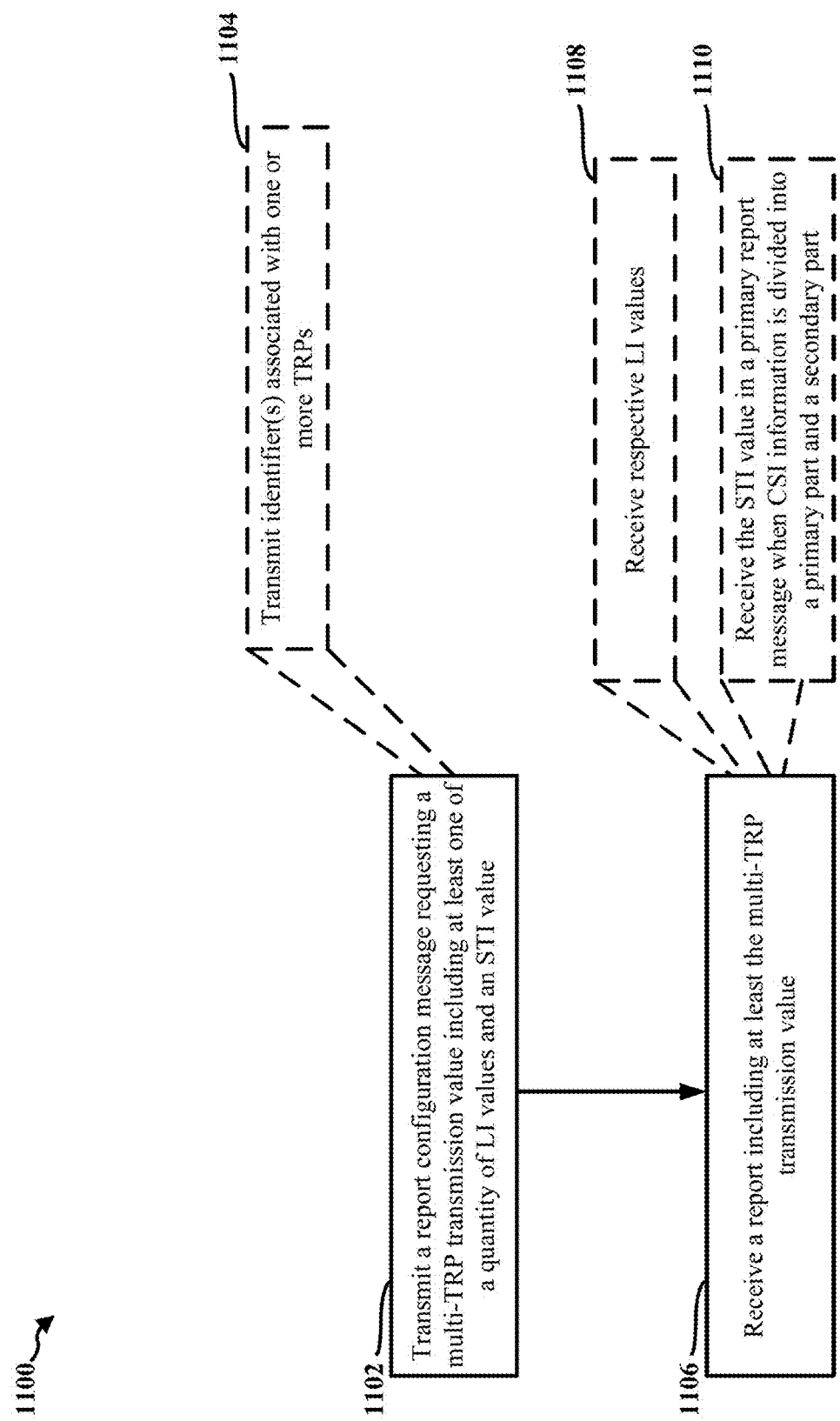
FIG. 11 is a flowchart of a method of wireless communication at a base station, in accordance with the teachings disclosed herein.

FIG. 11 is a flowchart 1100 of a method of wireless communication. The method may be performed by a base station (e.g., the base station 102/180, the base station 310, and/or an apparatus 1202 of FIG. 12). According to various aspects, one or more of the illustrated operations of the method of FIG. 11 may be omitted, transposed, and/or contemporaneously performed. Optional aspects are illustrated with a dashed line. The method may enable a base station to configure information included in a CSI report while operating in a multiple-TRP communication mode.

At 1102, the base station transmits a report configuration message requesting a multiple-TRP transmission value including at least one of a quantity of LI values and an STI value, as described in connection with the CSI report configuration message 520 of FIG. 5. For example, 1102 may be performed by a report configuration transmission component 1240 of the apparatus 1202 of FIG. 12. The CSI report configuration message 520 may comprise a CSI report configuration 522. In some examples, the base station may transmit the report configuration message in at least one of radio resource control (RRC) signaling, a medium access control (MAC) control element (CE), and downlink control information.

At 1106, the base station receives a report including at least the multiple-TRP transmission value, as described in connection with the CSI report messages 550, 560 of FIG. 5. For example, 1106 may be performed by the report reception component 1242 of the apparatus 1202 of FIG. 12.

In some examples, the report configuration message (e.g., at 1102) may include a request for zero LI values, one LI value, or a plurality of LI values. In some such examples, the base station may transmit, at 1104, identifier(s) associated with one or more TRPs (or TRP groups), as described in connection with the CSI report configuration 522 of FIG. 5. For example, 1104 may be performed by an identifiers component 1244 of the apparatus 1202 of FIG. 12. In some examples, the base station may transmit an identifier associated with a first TRP (or a first TRP group) when the request is for one LI value. In some examples, the base station may transmit respective identifiers associated with a plurality of TRPs (or TRP groups) when the request is for a plurality of LI values.

The base station may then receive, at 1108, the respective LI values, as described in connection with the CSI report messages 550, 560 of FIG. 5. For example, 1108 may be performed by an LI handling component 1246 of the apparatus 1202 of FIG. 12.

In some examples, if the report configuration message includes a request for zero LI values, then the report may include zero LI values. In some examples, if the report configuration message includes a request for one LI value, then the report may include one LI value associated with the first TRP (or the first TRP group). In some examples, if the report configuration message includes a request for a plurality of LI values, then the report may include a plurality of LI values associated with the plurality of TRPs (or TRP groups).

In some examples, the report configuration message may include a request to receive an STI value. In some such examples, the base station may receive, at 1110, the STI value in a primary report message when CSI information is divided into a primary part and a secondary part, as described above in connection with the primary CSI report message 550. For example, 1110 may be performed by an STI handling component 1248 of the apparatus 1202 of FIG. 12.

In some examples, the CSI information may be divided into a primary part and a secondary part. In some examples, the CSI information may be divided into the primary part and the secondary part based on at least one of uplink resources and a request indicated by the report configuration message. In some examples, the primary part of the CSI information may include at least the STI value, a set of CQI values associated with a TRP (or TRP group) indicated by the STI value, and information regarding a size of the secondary part of the CSI information. In some examples, the secondary part of the CSI information may include PMI for each TRP (or TRP group) associated with the multiple-TRP communication mode.

Figure 12:
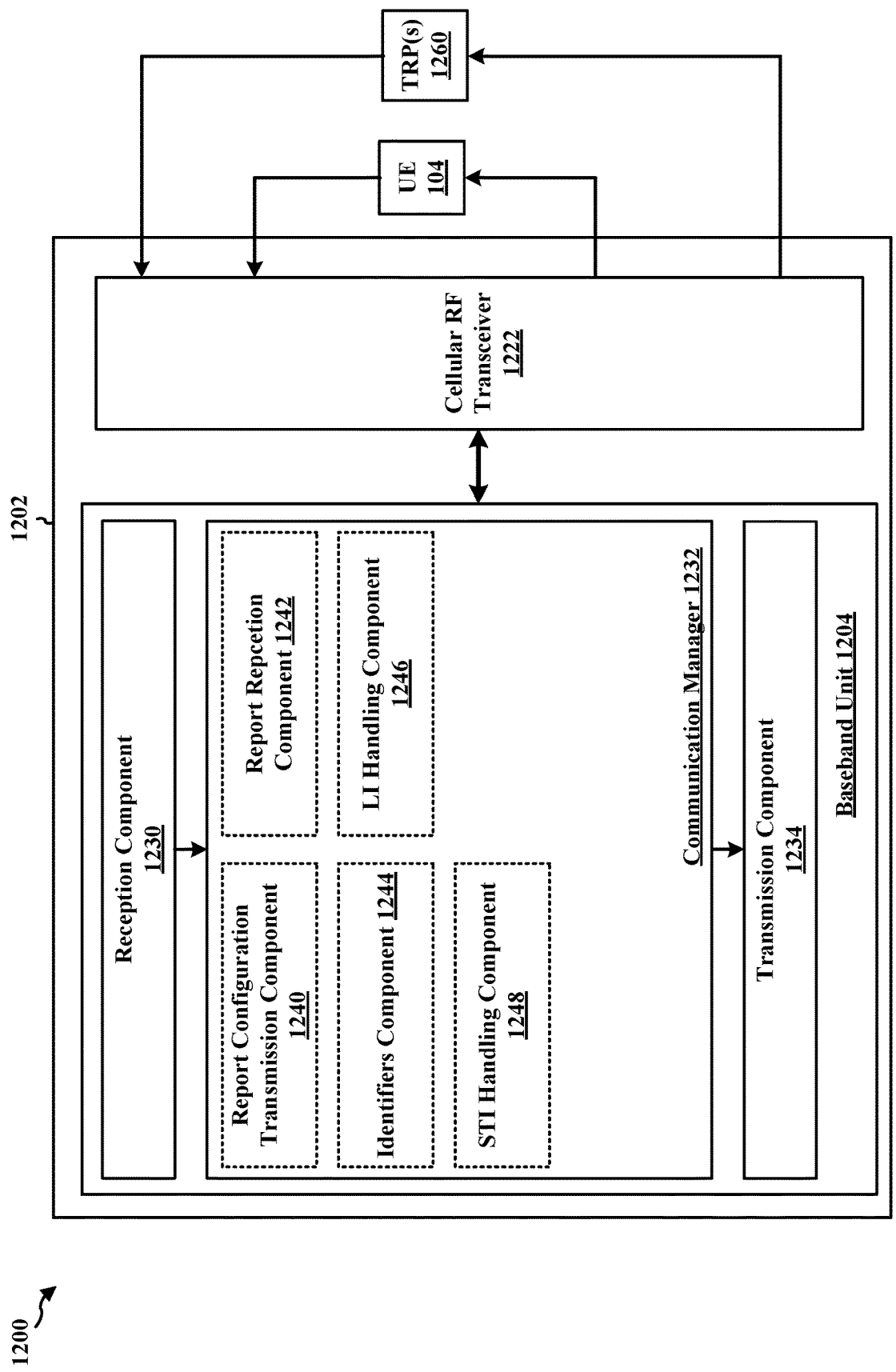
FIG. 12 is a diagram illustrating an example of a hardware implementation for an example apparatus, in accordance with the teachings disclosed herein.

FIG. 12 is a diagram 1200 illustrating an example of a hardware implementation for an apparatus 1202. The apparatus 1202 is a base station and includes a baseband unit 1204. The baseband unit 1204 may communicate through a cellular RF transceiver 1222 with the UE 104 and/or one or more TRP(s) 1260. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a report configuration transmission component 1240 that is configured to transmit a report configuration message requesting a multiple-TRP transmission value including at least one of a quantity of LI values and an STI value, for example, as described in connection with 1102 of FIG. 11.

The communication manager 1232 also includes a report reception component 1242 that is configured to receive a report including at least the multiple-TRP transmission value, for example, as described in connection with 1106 of FIG. 11.

The communication manager 1232 also includes an identifiers component 1244 that is configured to transmit identifier(s) associated with one or more TRPs (or TRP groups), for example, as described in connection with 1104 of FIG. 11.

The communication manager 1232 also includes an LI handling component 1246 that is configured to receive the respective LI values, for example, as described in connection with 1108 of FIG. 11.

The communication manager 1232 also includes an STI handling component 1248 that is configured to the STI value in a primary report message when CSI information is divided into a primary part and a secondary part, for example, as described in connection with 1110 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a user equipment (UE), a report configuration message triggering a channel state feedback procedure, the UE and the base station operating in a multiple transmission and reception point (multiple-TRP) communication mode, the report configuration message requesting a multiple-TRP transmission value including at least one of a quantity of layer indicator (LI) values and a strongest TRP indicator (STI) value. The example apparatus 1202 also includes means for receiving, from the UE, a report including at least the multiple-TRP transmission value.

In another configuration, the example apparatus 1202 also includes means for transmitting an identifier associated with a first TRP or a first TRP group. The example apparatus 1202 also includes means for receiving the LI value associated with the first TRP or the first TRP group.

In another configuration, the example apparatus 1202 also includes means for transmitting respective identifiers associated with a plurality of TRPs or a plurality of TRP groups. The example apparatus 1202 also includes means for receiving the LI values associated with the plurality of TRPs or the plurality of TRP groups.

In another configuration, the example apparatus 1202 also includes means for receiving the STI value in a primary report message when channel state information (CSI) information is divided into a primary part and a secondary part, the primary report message configured to include the primary part of the CSI information, wherein the CSI information is generated in response to performing of the channel state feedback procedure.

In another configuration, the example apparatus 1202 also includes means for receiving a primary report message when channel state information (CSI) information is divided into a primary part and a secondary part, the primary report message configured to include the primary part of the CSI information, and wherein the primary part of the CSI information includes at least one of a CSI reference signal resource indicator (CRI), a rank indicator (RI) value, and a wideband channel quality indicator (CQI) value associated with a TRP or a TRP group.

In another configuration, the example apparatus 1202 also includes means for transmitting the report configuration message in at least one of radio resource control (RRC) signaling, a medium access control (MAC) control element (CE), and downlink control information.

The aforementioned means may be one or more of the aforementioned components of the apparatus 1202 configured to perform the functions recited by the aforementioned means. As described supra, the apparatus 1202 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Example techniques disclosed herein enable UE to determine and report a configured quantity of LI values and/or an STI value in one CSI report. In some examples, the LI values may be used by the base station to determine the best layer to transmit PT-RS for each TRP (or TRP group). For example, the base station may determine that the base station is operating in a multiple-TRP communication mode and include a request for a configured quantity of LI values in the CSI report configuration to determine the best layer to transmit the PT-RS for each TRP (or TRP group).

In some examples, the base station may use the STI value to determine characteristics associated with a subsequent downlink message. Moreover, by including the STI value in the primary CSI report message, the base station may determine the characteristics using the CSI information included in the primary CSI report message and without incurring radio waste or increased transmission latency that may occur when one or more secondary CSI report messages are not received. In some examples, the CSI report configuration may cause the UE to include the STI value in the primary CSI report message when the UE divides the CSI information into a primary part and a secondary part.

Moreover, example techniques disclosed herein enable the UE to divide and group the CSI information into two parts (e.g., a primary part and a secondary part) and to group the CSI information of the secondary part into three groups. In some such examples, the UE may determine whether to retain and transmit CSI information or drop and not transmit CSI information based on the dividing and groupings.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication by a user equipment (UE), the method comprising: receiving, from a base station, a report configuration message triggering a channel state feedback procedure, the UE and the base station operating in a multiple transmission and reception point (multiple-TRP) communication mode, the report configuration message requesting a multiple-TRP transmission value including at least one of a quantity of layer indicator (LI) values and a strongest TRP indicator (STI) value; generating channel state information (CSI) information based on the receiving of the report configuration message, the CSI information including the multiple-TRP transmission value; and transmitting, to the base station, a report including the generated CSI information.

Aspect 2 is the method of aspect 1, further including that the generating of the CSI information including the quantity of LI values includes: determining a precoding matrix indicator (PMI) for each TRP or TRP group associated with the multiple-TRP communication mode; determining a strongest spatial layer for a precoding matrix indicated by each of the PMIs; and mapping each of the strongest spatial layers to a respective LI value.

Aspect 3 is the method of any of aspect 1 or aspect 2, further including that the report configuration message includes a request for zero LI values, one LI value, or a plurality of LI values.

Aspect 4 is the method of any of aspects 1 to 3, further including that the transmitting of the report including zero LI values comprises discarding the mapped LI values.

Aspect 5 is the method of any of aspects 1 to 4, further including that the transmitting of the report including one LI value comprises: receiving an identifier associated with a first TRP or a first TRP group; and transmitting the LI value associated with the first TRP or the first TRP group.

Aspect 6 is the method of any of aspects 1 to 5, further including that the report configuration message further indicates the identifier associated with the first TRP or the first TRP group.

Aspect 7 is the method of any of aspects 1 to 6, further including that the transmitting of the report including the plurality of LI values comprises: receiving respective identifiers associated with a plurality of TRPs or a plurality of TRP groups; and transmitting the LI values associated with the plurality of TRPs or the plurality of TRP groups.

Aspect 8 is the method of any of aspects 1 to 7, further including that the report configuration message further indicates the identifiers associated with the respective TRPs of the plurality of TRPs or the respective TRP groups of the plurality of TRP groups.

Aspect 9 is the method of any of aspects 1 to 8, further including sorting the plurality of LI values based on at least one of channel quality indicator (CQI) values, rank indicator (RI) values, and TRP index values.

Aspect 10 is the method of any of aspects 1 to 9, further including that sorting the plurality of LI values based on CQI values includes ranking a first LI value associated with a first TRP as higher priority than a second LI value associated with a second TRP when a first CQI value associated with the first TRP is a greater CQI value than a second CQI value associated with the second TRP.

Aspect 11 is the method of any of aspects 1 to 10, further including that sorting the plurality of LI values based on CQI values and RI values includes ranking the first LI value as higher priority than the second LI value when the first CQI value and the second CQI value are a same CQI value and a first RI value associated with the first TRP is a greater RI value than a second RI value associated with the second TRP.

Aspect 12 is the method of any of aspects 1 to 11, further including that sorting the plurality of LI values based on CQI values, RI values, and TRP index values includes ranking the first LI value as higher priority than the second LI value when the first CQI value and the second CQI value are the same CQI value, the first RI value and the second RI value are a same RI value, and a first TRP index value associated with the first TRP is a smaller index value than a second TRP index value associated with the second TRP.

Aspect 13 is the method of any of aspects 1 to 12, further including that the first TRP corresponds to a first group of TRPs and the second TRP corresponds to a second group of TRPs.

Aspect 14 is the method of any of aspects 1 to 13, further including that the generating of the CSI information including the STI value includes: determining a set of channel quality indicator (CQI) values for each TRP or TRP group associated with the multiple-TRP communication mode; identifying a largest CQI value from a plurality of sets of CQI values; and determining the STI value based on an identifier of a TRP or a TRP group associated with the largest CQI value.

Aspect 15 is the method of any of aspects 1 to 14, further including: determining whether to divide the CSI information into a primary part and a secondary part; and transmitting the STI value in a primary report message when the CSI information is divided into the primary part and the secondary part, the primary report message configured to include the primary part of the CSI information.

Aspect 16 is the method of any of aspects 1 to 15, further including that the determining of whether to divide the CSI information into the primary part and the secondary part is based on at least one of uplink resources and a request indicated by the report configuration message.

Aspect 17 is the method of any of aspects 1 to 16, further including that the primary part of the CSI information includes at least one of the STI value, the set of CQI values associated with the TRP or the TRP group indicated by the STI value, and information regarding a size of the secondary part of the CSI information.

Aspect 18 is the method of any of aspects 1 to 17, further including: determining whether to divide the CSI information into a primary part and a secondary part; and transmitting the primary part of the CSI information in a primary report message, wherein the primary part of the CSI information includes at least one of a CSI reference signal resource indicator (CRI), a rank indicator (RI) value, and a wideband channel quality indicator (CQI) value associated with a TRP or a TRP group.

Aspect 19 is the method of any of aspects 1 to 18, further including that the primary part of the CSI information further includes at least one of the STI value and an LI value.

Aspect 20 is the method of any of aspects 1 to 19, further including that the primary part of the CSI information includes the STI value when the CSI information includes a plurality of sets of CQI values.

Aspect 21 is the method of any of aspects 1 to 20, further including that the primary part of the CSI information includes the LI value when a corresponding RI value is greater than one.

Aspect 22 is the method of any of aspects 1 to 21, further including that the secondary part of the CSI information includes at least a precoding matrix indicator (PMI) for each TRP or TRP group associated with the multiple-TRP communication mode, wherein each PMI may be without frequency-compression or with frequency-compression, wherein PMI without frequency-compression includes wideband PMI information, sub-band PMI information for even sub-bands, and sub-band PMI information for odd sub-bands, and wherein PMI with frequency-compression includes spatial-domain basis information, higher-priority coefficients and frequency-domain basis information, and lower-priority coefficients and frequency-domain basis information.

Aspect 23 is the method of any of aspects 1 to 22, further including prioritizing the PMI for each TRP or TRP group based on a first grouping, a second grouping, and a third grouping, wherein the first grouping includes wideband PMI information or spatial-domain basis information, the second grouping includes sub-band PMI information for even sub-bands or higher-priority coefficients and frequency-domain basis information, and the third grouping includes sub-band PMI information for odd sub-bands or lower-priority coefficients and frequency-domain basis information.

Aspect 24 is the method of any of aspects 1 to 23, further including that the prioritizing of the PMI is based on a priority order for each grouping of each TRP or TRP group, and wherein the priority order is indicated by the report configuration message.

Aspect 25 is the method of any of aspects 1 to 24, further including that the priority order includes associating a first priority level to the first grouping of each TRP or TRP group, associating a second priority level to the second grouping of each TRP or TRP group, and associating a third priority level to the third grouping of each TRP or TRP group, wherein the second priority level is greater than the third priority level and less than the first priority level.

Aspect 26 is the method of any of aspects 1 to 25, further including that the priority order includes associating a first priority level to the first grouping, the second grouping, and the third grouping of a first TRP or a first TRP group, and associating a lower priority level to the first grouping, the second grouping, and the third grouping of a second TRP or a second TRP group.

Aspect 27 is the method of any of aspects 1 to 26, further including that the priority order includes associating a first priority level to the first grouping of each TRP or TRP group, associating a second priority level to the second grouping and the third grouping of a first TRP or a first TRP group, and associating a third priority level to the second grouping and the third grouping of a second TRP or a second TRP group, wherein the second priority level is greater than the third priority level and less than the first priority level.

Aspect 28 is the method of any of aspects 1 to 27, further including that the report configuration message is received in at least one of radio resource control (RRC) signaling, a medium access control (MAC) control element (CE), and downlink control information.

Aspect 29 is an apparatus for wireless communication including a memory and at least one processor coupled to a memory, the memory and the at least one processor configured to implement a method as in any of aspects 1 to 28.

Aspect 30 is an apparatus for wireless communication including means for implementing a method as in any of aspects 1 to 28.

Aspect 31 is a computer-readable medium storing computer executable code, where the code, when executed, causes a processor to implement a method as in any of aspects 1 to 28.

Aspect 32 is a method of wireless communication by a base station, the method comprising: transmitting, to a user equipment (UE), a report configuration message triggering a channel state feedback procedure, the UE and the base station operating in a multiple transmission and reception point (multiple-TRP) communication mode, the report configuration message requesting a multiple-TRP transmission value including at least one of a quantity of layer indicator (LI) values and a strongest TRP indicator (STI) value; and receiving, from the UE, a report including at least the multiple-TRP transmission value.

Aspect 33 is the method of aspect 32, further including that the report configuration message includes a request for zero LI values, one LI value, or a plurality of LI values.

Aspect 34 is the method of any of aspect 32 or aspect 33, further including that the receiving of the report including zero LI values includes receiving zero LI values for TRPs or TRP groups associated with the multiple-TRP communication mode.

Aspect 35 is the method of any of aspects 32 to 34, further including that the receiving of the report including one LI value comprises: transmitting an identifier associated with a first TRP or a first TRP group; and receiving the LI value associated with the first TRP or the first TRP group.

Aspect 36 is the method of any of aspects 32 to 35, further including that the report configuration message further indicates the identifier associated with the first TRP or the first TRP group.

Aspect 37 is the method of any of aspects 32 to 36, further including that the receiving of the report including the plurality of LI values comprises: transmitting respective identifiers associated with a plurality of TRPs or a plurality of TRP groups; and receiving the LI values associated with the plurality of TRPs or the plurality of TRP groups.

Aspect 38 is the method of any of aspects 32 to 37, further including that the report configuration message further indicates the identifiers associated with the respective TRPs of the plurality of TRPs or respective TRP groups of the plurality of TRP groups.

Aspect 39 is the method of any of aspects 32 to 38, further including that the receiving of the report including the STI value includes: receiving the STI value in a primary report message when channel state information (CSI) information is divided into a primary part and a secondary part, the primary report message configured to include the primary part of the CSI information, wherein the CSI information is generated in response to performing of the channel state feedback procedure.

Aspect 40 is the method of any of aspects 32 to 39, further including that the primary part of the CSI information includes at least one of the STI value, a set of channel quality indicator (CQI) values associated with a TRP or a TRP group indicated by the STI value, and information regarding a size of the secondary part of the CSI information.

Aspect 41 is the method of any of aspects 32 to 40, further including that the secondary part of the CSI information includes a precoding matrix indicator (PMI) for each TRP or TRP group associated with the multiple-TRP communication mode.

Aspect 42 is the method of any of aspects 32 to 41, further including that the receiving of the report includes: receiving a primary report message when channel state information (CSI) information is divided into a primary part and a secondary part, the primary report message configured to include the primary part of the CSI information, and wherein the primary part of the CSI information includes at least one of a CSI reference signal resource indicator (CRI), a rank indicator (RI) value, and a wideband channel quality indicator (CQI) value associated with a TRP or a TRP group.

Aspect 43 is the method of any of aspects 32 to 42, further including that the primary part of the CSI information further includes at least one of the STI value and an LI value.

Aspect 44 is the method of any of aspects 32 to 43, further including that the primary part of the CSI information includes the STI value when the CSI information includes a plurality of sets of CQI values.

Aspect 45 is the method of any of aspects 32 to 44, further including that the primary part of the CSI information includes the LI value when a corresponding RI value is greater than one.

Aspect 46 is the method of any of aspects 32 to 45, further including that the report configuration message is transmitted in at least one of radio resource control (RRC) signaling, a medium access control (MAC) control element (CE), and downlink control information.

Aspect 47 is an apparatus for wireless communication including a memory and at least one processor coupled to a memory, the memory and the at least one processor configured to implement a method as in any of aspects 32 to 46.

Aspect 48 is an apparatus for wireless communication including means for implementing a method as in any of aspects 32 to 46.

Aspect 49 is a computer-readable medium storing computer executable code, where the code, when executed, causes a processor to implement a method as in any of aspects 32 to 46.

What is claimed is:

1. A method of wireless communication by a user equipment (UE), the method comprising:
receiving, from a base station, a report configuration message triggering a channel state feedback procedure, the UE and the base station operating in a multiple transmission and reception point (multiple-TRP) communication mode, wherein the report configuration message requests a multiple-TRP transmission value that includes at least one of a quantity of layer indicator (LI) values and a strongest TRP indicator (STI) value;
generating channel state information (CSI) information based on the receiving of the report configuration message, the CSI information including selected multiple-TRP transmission values based in part on the report configuration message and on at least one of available uplink resources or propagation loss; and
transmitting, to the base station, a report including the generated CSI information.

2. The method of claim 1, wherein the generating of the CSI information including the quantity of LI values includes:
determining a precoding matrix indicator (PMI) for each TRP or TRP group associated with the multiple-TRP communication mode;
determining a strongest spatial layer for a precoding matrix indicated by each of the PMIs; and
mapping each of the strongest spatial layers to a respective LI value.

3. The method of claim 2, wherein the report configuration message includes a request for zero LI values, one LI value, or a plurality of LI values.

4. The method of claim 3, wherein the transmitting of the report including zero LI values comprises discarding the mapped LI values.

5. The method of claim 3, wherein the transmitting of the report including one LI value comprises:
receiving an identifier associated with a first TRP or a first TRP group; and
transmitting the LI value associated with the first TRP or the first TRP group.

6. The method of claim 3, wherein the transmitting of the report including the plurality of LI values comprises:
receiving respective identifiers associated with a plurality of TRPs or a plurality of TRP groups; and
transmitting the LI values associated with the plurality of TRPs or the plurality of TRP groups.

7. The method of claim 6, further comprising sorting the plurality of LI values based on at least one of channel quality indicator (CQI) values, rank indicator (RI) values, and TRP index values.

8. The method of claim 7, wherein sorting the plurality of LI values based on CQI values includes ranking a first LI value associated with a first TRP as higher priority than a second LI value associated with a second TRP when a first CQI value associated with the first TRP is a greater CQI value than a second CQI value associated with the second TRP.

9. The method of claim 8, wherein sorting the plurality of LI values based on CQI values and RI values includes ranking the first LI value as higher priority than the second LI value when the first CQI value and the second CQI value are a same CQI value and a first RI value associated with the first TRP is a greater RI value than a second RI value associated with the second TRP.

10. The method of claim 9, wherein sorting the plurality of LI values based on CQI values, RI values, and TRP index values includes ranking the first LI value as higher priority than the second LI value when the first CQI value and the second CQI value are the same CQI value, the first RI value and the second RI value are a same RI value, and a first TRP index value associated with the first TRP is a smaller index value than a second TRP index value associated with the second TRP.

11. The method of claim 8, wherein the first TRP corresponds to a first group of TRPs and the second TRP corresponds to a second group of TRPs.

12. The method of claim 1, wherein the generating of the CSI information including the STI value includes:
determining a set of channel quality indicator (CQI) values for each TRP or TRP group associated with the multiple-TRP communication mode;
identifying a largest CQI value from a plurality of sets of CQI values; and
determining the STI value based on an identifier of a TRP or a TRP group associated with the largest CQI value.

13. The method of claim 12, further comprising:
determining whether to divide the CSI information into a primary part and a secondary part; and
transmitting the STI value in a primary report message when the CSI information is divided into the primary part and the secondary part, the primary report message configured to include the primary part of the CSI information.

14. The method of claim 13, wherein the primary part of the CSI information includes at least one of the STI value, the set of CQI values associated with the TRP or the TRP group indicated by the STI value, and information regarding a size of the secondary part of the CSI information.

15. The method of claim 1, further comprising:
determining whether to divide the CSI information into a primary part and a secondary part; and
transmitting the primary part of the CSI information in a primary report message, wherein the primary part of the CSI information includes at least one of a CSI reference signal resource indicator (CRI), a rank indicator (RI)

value, and a wideband channel quality indicator (CQI) value associated with a TRP or a TRP group.

16. The method of claim 15, wherein the primary part of the CSI information further includes at least one of the STI value and an LI value,
wherein the primary part of the CSI information includes the STI value when the CSI information includes a plurality of sets of CQI values, and
wherein the primary part of the CSI information includes the LI value when a corresponding RI value is greater than one.

17. The method of claim 15, wherein the secondary part of the CSI information includes at least a precoding matrix indicator (PMI) for each TRP or TRP group associated with the multiple-TRP communication mode, wherein each PMI may be without frequency-compression or with frequency-compression, wherein PMI without frequency-compression includes wideband PMI information, sub-band PMI information for even sub-bands, and sub-band PMI information for odd sub-bands, and wherein PMI with frequency-compression includes spatial-domain basis information, higher-priority coefficients and frequency-domain basis information, and lower-priority coefficients and frequency-domain basis information.

18. The method of claim 17, further comprising prioritizing the PMI for each TRP or TRP group based on a first grouping, a second grouping, and a third grouping, wherein the first grouping includes wideband PMI information or spatial-domain basis information, the second grouping includes sub-band PMI information for even sub-bands or higher-priority coefficients and frequency-domain basis information, and the third grouping includes sub-band PMI information for odd sub-bands or lower-priority coefficients and frequency-domain basis information.

19. The method of claim 18, wherein the prioritizing of the PMI is based on a priority order for each grouping of each TRP or TRP group, and wherein the priority order is indicated by the report configuration message.

20. An apparatus for wireless communication of a user equipment (UE), comprising:
memory; and
at least one processor coupled to the memory and configured to:
receive, from a base station, a report configuration message triggering a channel state feedback procedure, the UE and the base station operating in a multiple transmission and reception point (multiple-TRP) communication mode, wherein the report configuration message requests a multiple-TRP transmission value that includes at least one of a quantity of layer indicator (LI) values and a strongest TRP indicator (STI) value;
generate channel state information (CSI) information based on the receiving of the report configuration message, the CSI information including selected multiple-TRP transmission values based in part on the report configuration message and on at least one of available uplink resources or propagation loss; and
transmit, to the base station, a report including the generated CSI information.

21. A method of wireless communication by a base station, the method comprising:
transmitting, to a user equipment (UE), a report configuration message triggering a channel state feedback procedure, the UE and the base station operating in a multiple transmission and reception point (multiple-TRP) communication mode, wherein the report configuration message requests a multiple-TRP transmission value that includes at least one of a quantity of layer indicator (LI) values and a strongest TRP indicator (STI) value; and
receiving, from the UE, a report including selected multiple-TRP transmission values based in part on the report configuration message and on at least one of available uplink resources or propagation loss.

22. The method of claim 21, wherein the report configuration message includes a request for zero LI values, one LI value, or a plurality of LI values.

23. The method of claim 22, wherein the receiving of the report including one LI value comprises:
transmitting an identifier associated with a first TRP or a first TRP group; and
receiving the LI value associated with the first TRP or the first TRP group.

24. The method of claim 22, wherein the receiving of the report including the plurality of LI values comprises:
transmitting respective identifiers associated with a plurality of TRPs or a plurality of TRP groups; and
receiving the LI values associated with the plurality of TRPs or the plurality of TRP groups.

25. The method of claim 21, wherein the receiving of the report including the STI value includes:
receiving the STI value in a primary report message when channel state information (CSI) information is divided into a primary part and a secondary part, the primary report message configured to include the primary part of the CSI information, wherein the CSI information is generated in response to performing of the channel state feedback procedure.

26. The method of claim 25, wherein the primary part of the CSI information includes at least one of the STI value, a set of channel quality indicator (CQI) values associated with a TRP or a TRP group indicated by the STI value, and information regarding a size of the secondary part of the CSI information.

27. The method of claim 25, wherein the secondary part of the CSI information includes a precoding matrix indicator (PMI) for each TRP or TRP group associated with the multiple-TRP communication mode.

28. The method of claim 21, wherein the receiving of the report includes:
receiving a primary report message when channel state information (CSI) information is divided into a primary part and a secondary part, the primary report message configured to include the primary part of the CSI information, and wherein the primary part of the CSI information includes at least one of a CSI reference signal resource indicator (CRI), a rank indicator (RI) value, and a wideband channel quality indicator (CQI) value associated with a TRP or a TRP group.

29. The method of claim 28, wherein the primary part of the CSI information further includes at least one of the STI value and an LI value,
wherein the primary part of the CSI information includes the STI value when the CSI information includes a plurality of sets of CQI values, and
wherein the primary part of the CSI information includes the LI value when a corresponding RI value is greater than one.

30. An apparatus for wireless communication of a base station, comprising:
- memory; and
- at least one processor coupled to the memory and configured to:
  - transmit, to a user equipment (UE), a report configuration message triggering a channel state feedback procedure, the UE and the base station operating in a multiple transmission and reception point (multiple-TRP) communication mode, wherein the report configuration message requests a multiple-TRP transmission value that includes at least one of a quantity of layer indicator (LI) values and a strongest TRP indicator (STI) value; and
  - receive, from the UE, a report including selected multiple-TRP transmission values based in part on the report configuration message and on at least one of available uplink resources or propagation loss.

* * * * *